US009812152B2

(12) United States Patent
Christian

(10) Patent No.: US 9,812,152 B2
(45) Date of Patent: Nov. 7, 2017

(54) SYSTEMS AND METHODS FOR IDENTIFYING A SOUND EVENT

(71) Applicant: OtoSense, Inc., Cambridge, MA (US)

(72) Inventor: Sebastien J. V. Christian, Somerville, MA (US)

(73) Assignee: OtoSense, Inc., Cambridge, MA (US)

( * ) Notice: Subject to any disclaimer, the term of this patent is extended or adjusted under 35 U.S.C. 154(b) by 0 days.

(21) Appl. No.: 14/616,627

(22) Filed: Feb. 6, 2015

(65) Prior Publication Data

US 2015/0221321 A1 Aug. 6, 2015

Related U.S. Application Data

(60) Provisional application No. 61/936,706, filed on Feb. 6, 2014.

(51) Int. Cl.
*G06F 17/00* (2006.01)
*G10L 25/27* (2013.01)
(Continued)

(52) U.S. Cl.
CPC ................ *G10L 25/27* (2013.01); *G08B 1/08* (2013.01); *G08B 17/10* (2013.01); *G08B 21/18* (2013.01);
(Continued)

(58) Field of Classification Search
CPC ......... G06F 17/30743; G06F 17/30758; G06F 17/30761; G06F 17/30017;
(Continued)

(56) References Cited

U.S. PATENT DOCUMENTS 5,918,223 A * 6/1999 Blum ................ G06F 17/30017
6,046,724 A 4/2000 Hvass
(Continued)

FOREIGN PATENT DOCUMENTS

EP 1 991 128 B1 4/2012
EP 2 478 836 A1 7/2012
(Continued)

OTHER PUBLICATIONS

Chang, C. et al., "LIBSVM: A Library for Support Vector Machines," ACM Transactions on Intelligent Systems and Technology, vol. 2; No. 3, Article 27, Apr. 2011.
(Continued)

*Primary Examiner* — Andrew C Flanders
(74) *Attorney, Agent, or Firm* — Nutter McClennen & Fish LLP

(57) ABSTRACT

Systems and methods for identifying a perceived sound event are provided. In one exemplary embodiment, the system includes an audio signal receiver, a processor, and an analyzer. The system deconstructs a received audio signal into a plurality of audio chunks, for which one or more sound identification characteristics are determined. One ore more distances of a distance vector are then calculated based on one or more of the sound identification characteristics. The distance vector can be a sound gene that serves as an identifier for the sound event. The distance vector for a received audio signal is compared to distance vectors of predefined sound events to identify the source of the received audio signal. A variety of other systems and methods related to sound identification are also provided.

41 Claims, 25 Drawing Sheets

(51) Int. Cl.

| | |
|---|---|
| ***G08B 21/18*** | (2006.01) |
| ***G08B 1/08*** | (2006.01) |
| ***G10L 25/48*** | (2013.01) |
| ***G10L 21/14*** | (2013.01) |
| ***G08B 17/10*** | (2006.01) |

(52) U.S. Cl.
CPC .............. *G10L 21/14* (2013.01); *G10L 25/48* (2013.01); *G10H 2210/301* (2013.01)

(58) Field of Classification Search
CPC ......... G06F 17/30598; G06F 17/30749; G10L 17/26; G10L 25/51; G10L 25/27; G06K 9/00523; G06K 9/00536
See application file for complete search history.

(56) References Cited

U.S. PATENT DOCUMENTS

| | | | |
|---|---|---|---|
| 6,240,392 B1 | 5/2001 | Butnaru et al. | |
| 7,126,467 B2 | 10/2006 | Albert et al. | |
| 7,129,833 B2 | 10/2006 | Albert | |
| 7,173,525 B2 | 2/2007 | Albert | |
| 7,391,316 B2 | 6/2008 | Albert et al. | |
| 7,991,206 B1* | 8/2011 | Kaminski, Jr. | G06K 9/00744 382/100 |
| 8,082,279 B2* | 12/2011 | Weare | G06F 17/30598 707/732 |
| 8,247,677 B2 | 8/2012 | Ludwig | |
| 8,309,833 B2 | 11/2012 | Ludwig | |
| 8,440,902 B2 | 5/2013 | Ludwig | |
| 8,463,000 B1* | 6/2013 | Kaminski, Jr. | G06F 17/30628 382/100 |
| 8,488,820 B2 | 7/2013 | Pedersen | |
| 8,540,650 B2 | 9/2013 | Salmi et al. | |
| 8,546,674 B2 | 10/2013 | Kurihara et al. | |
| 8,706,276 B2* | 4/2014 | Ellis | G10L 25/54 700/94 |
| 8,781,301 B2 | 7/2014 | Fujita | |
| 8,838,260 B2* | 9/2014 | Pachet | A01K 15/02 700/94 |
| 9,215,539 B2* | 12/2015 | Kim | H04R 29/00 |
| 9,466,316 B2 | 10/2016 | Christian | |
| 2002/0023020 A1* | 2/2002 | Kenyon | G06Q 30/02 704/231 |
| 2002/0037083 A1* | 3/2002 | Weare | G06F 17/30038 381/58 |
| 2002/0164070 A1 | 11/2002 | Kuhner et al. | |
| 2003/0045954 A1* | 3/2003 | Weare | G06F 17/30743 700/94 |
| 2003/0086341 A1* | 5/2003 | Wells | G06F 17/30017 369/13.56 |
| 2005/0091275 A1* | 4/2005 | Burges | G06F 17/30017 |
| 2005/0102135 A1 | 5/2005 | Goronzy et al. | |
| 2005/0289066 A1 | 12/2005 | Weare | |
| 2007/0276733 A1* | 11/2007 | Geshwind | G06Q 30/02 705/14.49 |
| 2008/0001780 A1* | 1/2008 | Ohno | G08G 1/0962 340/904 |
| 2008/0085741 A1 | 4/2008 | Tauberman et al. | |
| 2008/0276793 A1 | 11/2008 | Yamashita et al. | |
| 2010/0114576 A1 | 5/2010 | Sundararajan | |
| 2010/0271905 A1 | 10/2010 | Khan et al. | |
| 2011/0283865 A1 | 11/2011 | Collins | |
| 2012/0066242 A1 | 3/2012 | Sathya | |
| 2012/0113122 A1 | 5/2012 | Takazawa et al. | |
| 2012/0143610 A1 | 6/2012 | Wang et al. | |
| 2012/0224706 A1 | 9/2012 | Hwang et al. | |
| 2012/0232683 A1* | 9/2012 | Master | G06F 17/30743 700/94 |
| 2013/0065641 A1 | 3/2013 | Gross | |
| 2013/0215010 A1 | 8/2013 | Hermodsson | |
| 2013/0222133 A1 | 8/2013 | Schultz et al. | |
| 2013/0345843 A1* | 12/2013 | Young | G06F 17/30743 700/94 |
| 2015/0221190 A1 | 8/2015 | Christian | |
| 2016/0022086 A1* | 1/2016 | Yuan | G10L 25/51 700/94 |
| 2016/0330557 A1 | 11/2016 | Christian et al. | |
| 2016/0379666 A1 | 12/2016 | Christian et al. | |

FOREIGN PATENT DOCUMENTS

| | | |
|---|---|---|
| WO | 2013/113078 A1 | 8/2013 |
| WO | 2015/120184 A1 | 8/2015 |

OTHER PUBLICATIONS

Chang, C. et al., "LIBSVM: A Library for Support Vector Machines," http://www.csie.ntu.edu.tw/~cjlin/libsvm/; accessed May 29, 2015.
International Search Report and Written Opinion for Application No. PCT/US2015/014927. (13 pages).
[No Author Listed] Known product—SHAZAM, http://www.shazam.com/apps; accessed Jun. 1, 2015.
Brendel, W., et al., Probabilistic Event Logic for Interval-Based Event Recognition. Proc. IEEE Computer Vision and Pattern Recognition (CVPR), Colorado Springs, CO, 2011, pp. 3329-3336.
International Search Report and Written Opinion for Application No. PCT/US2015/014669, dated May 18, 2015 (10 pages).

* cited by examiner

Chunk C

Chunk C multiplied by a Hann window

182

184

186

SYSTEMS AND METHODS FOR IDENTIFYING A SOUND EVENT

FIELD

The present invention relates to systems and methods for determining the source of a perceived sound, and more particularly relates to using sound identification characteristics of a perceived sound to identify the source of the sound, i.e., the type of sound.

BACKGROUND

Every day people hear a host of sounds, some of which are more recognizable than others. In some instances, a person will recognize the source of a particular sound the instant he or she hears it. For example, a dog's owner may easily recognize that the source of a particular dog bark is his or her own dog. In other instances, a person may be less certain as to the source of a particular sound. He or she may have some inclination as to what is making a particular sound, but is not certain. There may be other sounds being made simultaneously with the sound in question, making it more difficult to truly discern the source of the sound of interest. In still other instances, a person may be perplexed as to the source of a particular sound. In instances in which a person does not know, or is at least unsure, of the source of a particular sound, it can be useful for that person to have assistance in identifying the source of the sound. Aside from putting that person at ease by providing an answer to an unknown, allowing a person to identify a source of a sound can allow the person to take any actions that may be advisable in light of knowing the source of the sound. For example, once a person is able to identify the sound of police car siren, the person can take action to move out of the way so that the person does not obstruct the path of the police car.

Individuals with hearing impairment or hearing loss is a segment of the population that in particular can benefit from sound monitoring systems, devices, and methods that enhance the detection, recognition, and identification of sounds. People with hearing loss can often endure specific stress and risk related to their reduced capacity to be alerted of important and in some instances life-threatening sounds. They may not hear the sounds that can prevent injury or neglect, such as a breaking glass, a knock on the door, a fire-alarm, or the siren of an approaching emergency vehicle.

Conventional systems, devices, and methods that are known in the art and directed toward alerting individuals with hearing impairment about the activation of an emergency alarm are designed for integration in emergency alert systems incorporated into buildings with a central alarm. These systems, and the personal alert systems utilized in hospitals, are limited in so far as they do not include sound recognition capabilities that are operable on a user's mobile device, do not classify and identify sounds according to audible and non-audible data in the environment in which the sound occurs, do not incorporate an adaptive learning inferential engine to enhance machine learning about new incoming sounds, and do not increase the efficiency of sound recognition utilizing an open sourced database of sound events. Further, to the extent mobile applications and other systems, devices, and methods exist for the purposes of identifying a sound event, such as identifying a particular song, these mobile applications, systems, devices, and methods often require a lengthy amount of that sound event to be played before it can be identified, and the ways the sound event are identified are limiting. Additionally, existing systems, devices, and methods are limited in that they are not generally able to identify multiple sound events simultaneously, or even near simultaneously.

Accordingly, there is a need for systems, devices, and methods that are able to identify the source of a sound in real time based on a very small sample size of that sound despite background or extraneous sounds or noise, and which are also able to identify the sources of multiple sounds near simultaneously.

SUMMARY

Systems and methods are generally provided for identifying the source of a sound event. In one exemplary embodiment, a method for identifying a sound event includes receiving a signal from an incoming sound event and deconstructing the signal into a plurality of audio chunks. One or more sound identification characteristics of the incoming sound event for one or more of the audio chunks of the plurality of audio chunks are then determined. One or more distances of a distance vector based on one or more of the one or more sound identification characteristics can then be calculated. The method further includes comparing in real time one or more of the one or more distances of the distance vector of the incoming sound event to one or more commensurate distances of one or more predefined sound events stored in a database. The incoming sound event can be identified based on the comparison between the one or more distances of the incoming sound event and the one or more commensurate distances of the plurality of predefined sound events stored in the database, and the identity of the incoming sound event can be communicated to a user.

In some embodiments, prior to determining one or more sound identification characteristics of the incoming sound event for an audio chunk, the audio chunk can be multiplied by a Hann window and a Discrete Fourier Transform can be performed on the audio chunk. Further, a logarithmic ratio can be performed on the audio chunk after the Discrete Fourier Transform is performed, and the result can then be rescaled.

The sound identification characteristics that are determined can be any number of characteristics either described herein, derivable therefrom, or known to those skilled in the art. Some of the characteristics can be derived from the signal of the sound event and include, by way of non-limiting examples, a Soft Surface Change History, a Soft Spectrum Evolution History, a Spectral Evolution Signature, a Main Ray History, a Surface Change Autocorrelation, and a Pulse Number. Other characteristics derived from the signal of the sound event and discussed herein include a High Peaks Number, a Rhythm, and a BRH (Brutality, Purity, and Harmonicity) Set. Sound identification characteristics can also be derived from an environment surrounding the sound event and include, by way of non-limiting examples, a location, a time, a day, a position of a device that receives the signal from the incoming sound event, an acceleration of the device that receives the signal from the incoming sound event, and a light intensity detected by the device that receives the signal of the incoming sound event.

The one or more distances of a distance vector that are calculated can be any number of distances either described herein, derivable therefrom, or known to those skilled in the art. Some of the distances can be calculated based on sound identification characteristics that are derived from the signal of the sound event and include, by way of non-limiting examples, a Soft Surface Change History, Main Ray Histories Matching, Surface Change History Autocorrelation Matching, Spectral Evolution Signature Matching, and a Pulse Number Comparison. Distances can also be calculated based on sound identification characteristics that are derived from the environment surrounding the sound event and include, by way of non-limiting examples, a location, a time, a day, a position of a device that receives the signal from the incoming sound event, an acceleration of the device that receives the signal from the incoming sound event, and a light intensity detected by the device that receives the signal of the incoming sound event. In some embodiments, an average of the distances of the distance vector can itself be a calculated distance, and can be included as a distance in the distance vector.

A user interface can be provided to allow a user to enter information about the incoming sound event. Information about the distances of predefined sound events stored in the database can be adjusted based on information entered by the user.

In some embodiments, prior to or during the step of comparing in real time one or more of the one or more distances of the distance vector of the incoming sound event to one or more commensurate distances of one or more predefined sound events stored in a database, the comparing step can be optimized. For example, one or more predefined sound events can be eliminated from consideration based on commensurate information known about the incoming sound event and the one or more predefined sound events. A number of different optimization efforts can be made, including those described herein, derivable therefrom, or otherwise known to those skilled in the art. Such optimization efforts can include performing a Strong Context Filter, performing a Scan Process, and/or performing a Primary Decision Module.

The method can also include identifying which of the one or more distances of the distance vector of an incoming sound event or a predefined sound event have the greatest impact on determining the identity of the incoming sound event, and then comparing one or more of the identified distances of the incoming sound event to the commensurate distances of the one or more predefined sound events before comparing other distances of the incoming sound event to the other commensurate distances of the one or more predefined sound events.

One exemplary embodiment of a system includes an audio signal receiver, a processor, and an analyzer. The processor is configured to divide an audio signal received by the audio signal receiver into a plurality of audio chunks. The analyzer is configured to determine one or more sound identification characteristics of one or more audio chunks of the plurality of audio chunks, calculate one or more distances of a distance vector based on the one or more sound identification characteristics, and compare in real time one or more of the distances of the distance vector of the received audio signal to one or more commensurate distances of a distance vector of one or more predefined sound events stored in a database.

The sound identification characteristics determined by the analyzer can be any number of characteristics either described herein, derivable therefrom, or known to those skilled in the art. Some of the characteristics can be derived from the audio signal and include, by way of non-limiting examples, a Soft Surface Change History, a Soft Spectrum Evolution History, a Spectral Evolution Signature, a Main Ray History, a Surface Change Autocorrelation, and a Pulse Number. Other characteristics derived from the audio signal and discussed herein include a High Peaks Number, a Rhythm, and a BRH (Brutality, Purity, and Harmonicity) Set. Sound identification characteristics can also be derived from an environment surrounding the audio signal and include, by way of non-limiting examples, a location, a time, a day, a position of a device that receives the audio signal, an acceleration of the device that receives the audio signal, and a light intensity detected by the device that receives the audio signal.

The one or more distances calculated by the analyzer can be any number of distances either described herein, derivable therefrom, or known to those skilled in the art. Some of the distances can be calculated based on sound identification characteristics that are derived from the audio signal and include, by way of non-limiting examples, a Soft Surface Change History, Main Ray Histories Matching, Surface Change History Autocorrelation Matching, Spectral Evolution Signature Matching, and a Pulse Number Comparison. Distances can also be calculated based on sound identification characteristics that are derived from the environment surrounding the audio signal and include, by way of non-limiting examples, a location, a time, a day, a position of a device that receives the audio signal, an acceleration of the device that receives the audio signal, and a light intensity detected by the device that receives the audio signal. In some embodiments, an average of the distances of the distance vector can itself be a calculated distance, and can be included as a distance in the distance vector.

In some embodiments, the system can include a user interface that is in communication with the analyzer and is configured to allow a user to input information that the analyzer can use to adjust at least one of one or more characteristics and one or more distances of the one or more predefined sound events stored in the database. The database can be a local database. Still further, the system can include an adaptive learning module that is configured to refine one or more distances for the one or more predefined sound events stored in the database.

In one exemplary embodiment of a method for creating a sound identification gene, the method includes deconstructing an audio signal into a plurality of audio chunks, determining one or more sound identification characteristics for one or more audio chunks of the plurality of audio chunks, calculating one or more distances of a distance vector based on the one or more sound identification characteristics, and formulating a sound identification gene based on an N-dimensional comparison of the calculated one or more distances, where N represents the number of calculated distances.

In some embodiments, the method can include adjusting a profile for the sound identification gene based on user input related to accuracy of later received audio signals. For example, a profile for the sound identification gene can be adjusted by adjusting a hyper-plane that extends between identified true positive results and identified false positive results for the sound identification gene.

The sound identification characteristics that are determined can be any number of characteristics either described herein, derivable therefrom, or known to those skilled in the art. Some of the characteristics can be derived from the audio signal and include, by way of non-limiting examples, a Soft Surface Change History, a Soft Spectrum Evolution History, a Spectral Evolution Signature, a Main Ray History, a Surface Change Autocorrelation, and a Pulse Number. Other characteristics derived from the audio signal and discussed herein include a High Peaks Number, a Rhythm, and a BRH (Brutality, Purity, and Harmonicity) Set. Sound identification characteristics can also be derived from an environment surrounding the audio signal and include, by way of non-limiting examples, a location, a time, a day, a position of a device that receives the signal, an acceleration of the device that receives the signal, and a light intensity detected by the device that receives the signal.

The one or more distances of a distance vector that are calculated can be any number of distances either described herein, derivable therefrom, or known to those skilled in the art. Some of the distances can be calculated based on sound identification characteristics that are derived from the audio signal and include, by way of non-limiting examples, a Soft Surface Change History, Main Ray Histories Matching, Surface Change History Autocorrelation Matching, Spectral Evolution Signature Matching, and a Pulse Number Comparison. Distances can also be calculated based on sound identification characteristics that are derived from the environment surrounding the audio signal and include, by way of non-limiting examples, a location, a time, a day, a position of a device that receives the signal, an acceleration of the device that receives the signal, and a light intensity detected by the device that receives the signal. In some embodiments, an average of the distances of the distance vector can itself be a calculated distance, and can be included as a distance in the distance vector.

BRIEF DESCRIPTION OF DRAWINGS

This invention will be more fully understood from the following detailed description taken in conjunction with the accompanying drawings, in which.

DETAILED DESCRIPTION

Figure 1:
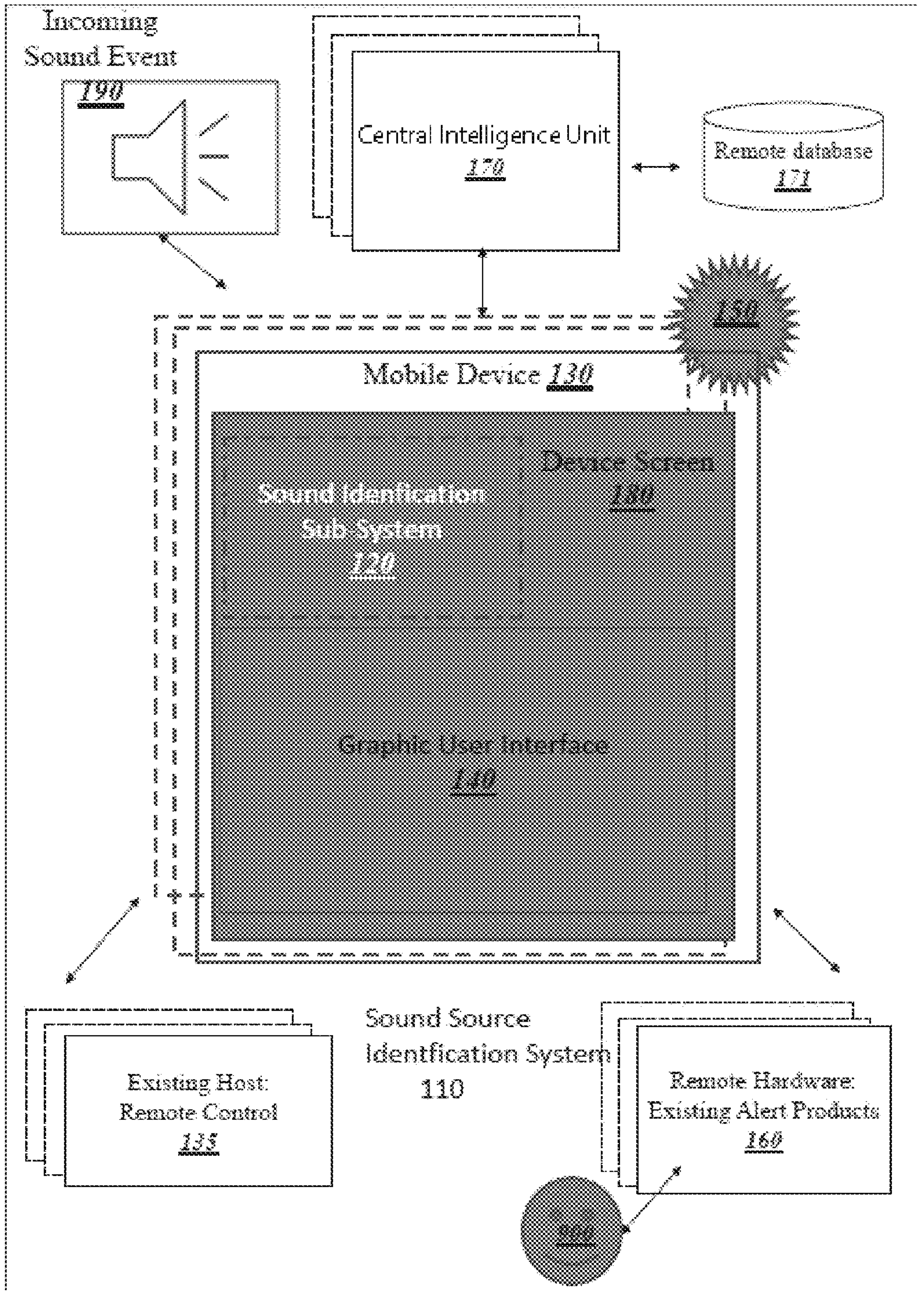
FIG. 1 is a schematic illustration of one exemplary embodiment of a sound source identification system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. A person skilled in the art will recognize that certain terms are used herein interchangeably. By way of non-limiting example, the terms “sound” and “sound event” are used interchangeably, and are generally intended to represent the same occurrence.

The present disclosure generally provides for systems, devices, and methods that are able to identify a sound event in real time based on one or more characteristics associated with the sound event. Identifying a sound event can include determining a source of the sound event and providing an appropriate label for the sound event. For example, a sound event perceived by a device or system may be identified by the device or system as a “door bell,” “smoke alarm,” or “car horn.” While the particulars of the identification process occurs will be described in greater detail below, generally the received sound wave is broken down into a plurality of small time or audio chunks, which can also then be illustrated as spectrums, and one or more of the chunks and/or spectrums are analyzed to determine various sound identification characteristics for that audio chunk, and thus that sound event. The various sound identification characteristics can be used to determine a sound gene for that particular sound, and an identified sound can have one or more sound genes that formulate the identify for a particular sound event. The characteristics can include data or information that is specific to that particular sound, as well as data or information that is specific to the context with which that particular sound is associated, such as a location, time, amount of light, or acceleration of the device receiving the sound. The various characteristics can be part of a gene for the sound event, which is a N-dimensional vector that becomes an identifier for that sound event, the number of dimensions for the vector being based on the number of characteristics that are used to define the particular sound event. One or more of the characteristics and/or sound genes derived from the audio chunk are then compared to commensurate characteristics and/or sound genes of predefined sound events stored in one or more databases to determine the predefined sound event that best matches the perceived sound event. Once the identification is made, the identification is communicated, for instance by displaying a label for that perceived sound event. The databases of predefined sound events can be local, and thus stored in the systems or devices, and/or they can be accessible via one or more networks.

If no predefined sound event can be associated with the perceived sound event, other methods can be performed to identify the source of the perceived sound event. For example, the system or device can receive user input about the sound event to help the system learn the characteristics associated with a particular sound event so that sound event may be accurately identified in the future. This learning that occurs relates to an inferential engine, and is not to be confused with a learning layer, which is one of three layers used to initially define sound events based on comparing the perceived sound event to one or more databases of sound events. The three layers of the sound event, which are described in greater detail below, include a sound information layer, a multimodal layer, and a learning layer. Additionally, the systems and devices can be designed so that each particular sound event has a unique display on a display device such that a person viewing the display device can identify a particular display as being associated with a particular sound event. Sound identification characteristics can also be displayed and used to identify a particular sound event by a viewer of the display device.

Sound Source Identification System

One exemplary sound source identification system 110 is provided for in FIG. 1. The system 110 implements one or more of the devices, methods, and functions described herein, and can include a sound identification sub-system 120 that is configured to process a received sound signal from a sound event 190 and identify the incoming sound event on a user’s device, e.g., a mobile device 130 having a device screen 180, an interactive user interface 140, and an audio signal receiver, as illustrated a microphone 150. The sound identification sub-system 120 can function as a stand-alone unit when operating on a mobile device 130. It can be powered independent from any external power supply for a period of time. In some exemplary embodiments, the sound identification sub-unit can operate on a mobile device for more than five hours without an external power supply being associated with the mobile device. Notably, while the present disclosure provides for some examples of a system and components thereof for performing the sound identification analysis provided for herein, a person skilled in the art will recognize a number of different systems, and components thereof, that can be used and adapted for use in light of the present disclosures to perform the functions described herein.

As shown in FIG. 1, the sub-system 120 can communicate with one or more databases, as shown a central remote database 171, by way of a central intelligence unit 170. In the illustrated embodiment the central intelligence unit 170 and the central remote database 171 are located separate from the mobile device 130, and thus can be in communication with the mobile device 130 via one or more networks.

Figure 2:
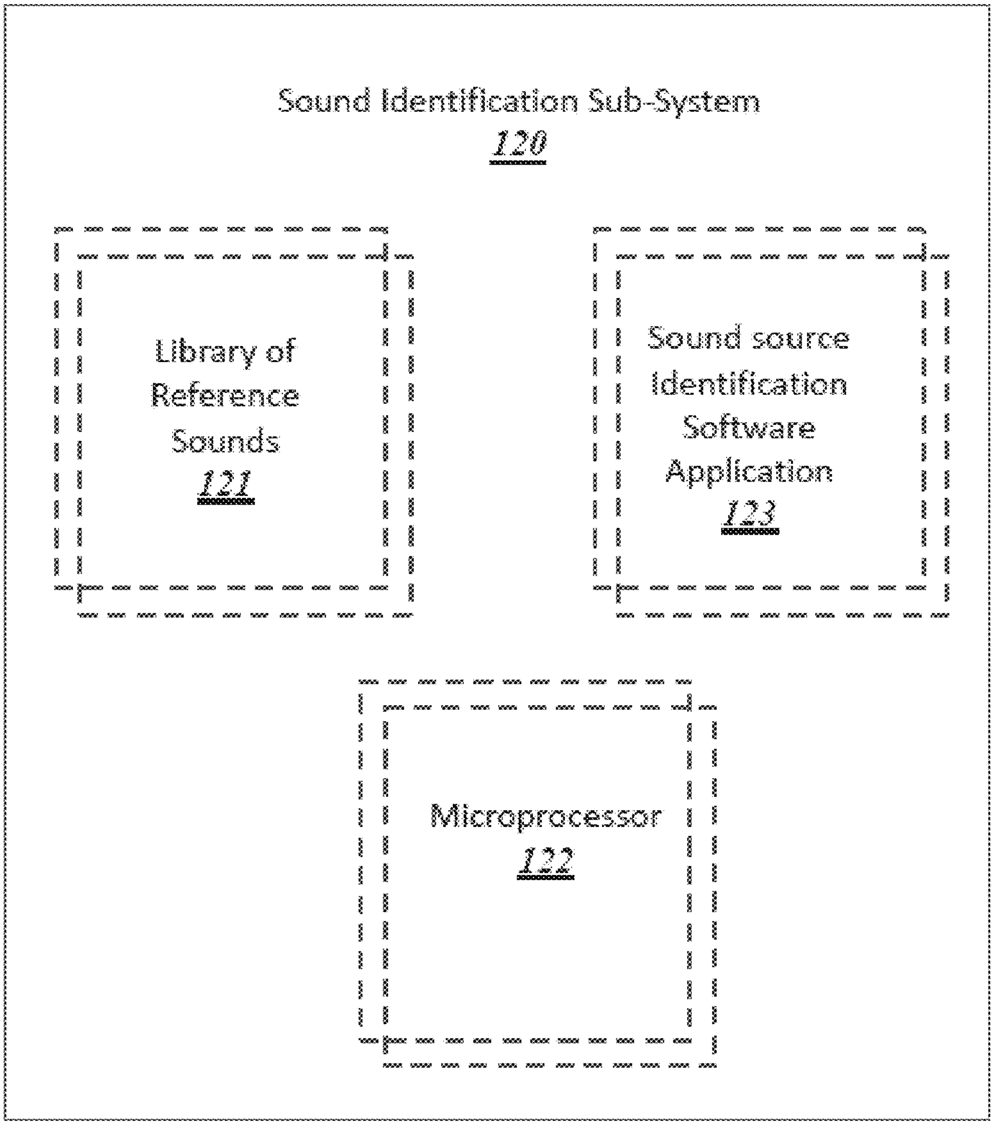
FIG. 2 is a schematic illustration of a sub-system of the sound source identification system of FIG. 1.

In other embodiments, the sound identification sub-system 120 can operate autonomously. As such, the central intelligence unit 170 and the database 171 can be local, i.e., each can be part of the mobile device 130 themselves. In fact, as shown in FIG. 2, the sound identification sub-system 120 can include a library of reference sounds 121 that is a local database that can be used in the sound identification process. In some instances, only a local database is used, while in other instances, only a remote database is used. While the illustrated embodiment provides a single central intelligence unit 170 and a single remote database 171 (exclusive of the library of reference sounds 121, which is also a database), in other embodiments multiple intelligence units and/or multiple databases can be provided, with each having the ability to local or communicated through one or more networks such that central intelligence units and databases can be provided both locally and over one or more networks. Embodiments in which sound recognition occurs based on information stored locally, i.e., not over a network connection, can operate more quickly and sometimes more reliably due to there not being a need to transmit data to and from the mobile device to a remote location. Even embodiments that include databases accessibly both locally and over a network can be operated such that they only operate locally in certain modes, thereby providing quicker and perhaps more reliable feedback while also possibly saving on battery life for the mobile device 130.

The mobile device 130 can include a number of components that can be part of the sound identification process. An audio signal receiver, as shown the microphone 150, can be provided for receiving a sound event. The sound event can then be processed and otherwise analyzed by the sound identification sub-system, as described in greater detail below with respect to FIG. 2. A graphic user interface 140 can be associated with the mobile device 130. As described in further detail, the graphic user interface can be used to allow for user feedback and input about received and analyzed sound events, which in turn can be used to assist in various learning features provided for in the present disclosure. The device screen 180 can be used to display information to the user about the sound event, as part of the graphic user interface 140, and can also be used in conjunction with various identification features that are useful to those who are unable to hear or hear well.

The mobile device 130 is provided as one, non-limiting example of a device on which a sound source identification system 110 can be operated. A person having skill in the art will appreciate that any number of other electronic devices can be used to host and/or operate the various embodiments of a sound source identification system and related methods and functions provided for herein. For example, computers, wireless multimedia devices, personal digital assistants, and tablets, are just some examples of the types of devices that can be used in conjunction with the present disclosures. Likewise, a device for processing an incoming signal from a sound event can be a number of different devices, including but not limited to the mobile device 130, a remote central intelligence unit 170 (whether part of the mobile device 130 or merely in communication therewith), or a remote host device 135. An additional or a plurality of additional remote hardware components 160 that are capable of receiving an outgoing device signal, for example, a short message service (SMS) notification of events from a host device 135, can be included as components of, or components in communication with, the sound source identification system 110. These can be but are not limited to existing remote alert products, such as a vibrating watch. As a result, once a sound event has been appropriately identified, various alerts can be sent to the alert products where appropriate. For example, if the identified sound event is a smoke alarm, a signal can be sent to the user to alert that user that the sound event is a smoke alarm, thus allowing the user to take appropriate action. Further, a capability to alert one or more third parties 900, such as a fire station, by a plurality of mechanisms can also be included. An example of such a mechanism can be, but is not limited to, sending a push notification on another device or sending an SMS about an event related to, for example, security. A person having skill in the art will appreciate that any form of notification or messaging can be implemented to provide alert functionality without departing from the spirit of the present disclosure.

FIG. 2 is an illustrative, non-limiting example of components of the sound identification sub-system 120. These can include, but are not limited to, a local dynamic memory populated and/or populating with at least a library of reference sounds 121, a microprocessor 122 (or more generally a processor), and the sound source identification software application 123 that can execute on the microprocessor 122, also referred to herein as an analyzer. The microprocessor 122 can also be used to convert the received audio signal into a plurality of time chunks from which sound identification characteristics can be extracted or otherwise derived. The microprocessor 122, or alternatively the analyzer 123, can likewise be used to extract or derive the sound identification characteristics, which together form a sound gene. One or more sound genes can form the basis of a sound event that can be stored in the library of reference sounds.

A mobile device 130 equipped with a sound source identification software application or analyzer 123 can operate to process sounds and to drive the interactive user interface 140. More particularly, the application 123, in conjunction with the microprocessor 122, can be used to convert the received audio signal into a plurality of time chunks from which sound identification characteristics can be extracted or otherwise derived. The application 123 can then extract or otherwise derive one or more sound characteristics from one or more of the time chunks, and the characteristic(s) together can form one or more sound genes for the received sound. As described in further detail below, the characteristic(s) and sound gene(s) for the received sound can then be compared to characteristics and sound genes associated with reference sounds contained in the library of reference sounds 121 by the application 123 so that a determination as to the source of the sound event can be made. Further, the characteristic(s) and sound gene(s) for the received sound can be stored in the library of reference sounds 121, either as additional data for sounds already contained in the library or as a new sound not already contained in the library. A person skilled in the art will recognize that the microprocessor 122 and analyzer 123 can be configured to perform these various processes, as can other components of computer, smart phone, etc., in view of the present disclosures, without departing from the spirit of the present disclosure.

Alternatively, or additionally, the mobile device 130 can exchange incoming and outgoing information with remote hardware components 160 and/or the central intelligence unit 170 that can be equipped with its sound source identification software application 123 and/or one or more remote databases 171. The remote database(s) 171 can serve as a remote library of reference sounds 121 and can supplement the library of reference sounds 121 stored on the mobile device 130. One of skill in the art will appreciate that any host device 135 or server in communication with the sound source identification software application 123 operating on the mobile device 130 (or remote hardware components 160 and/or the central intelligence unit 170) can function to process and identify sounds and to drive the interactive user interface 140 as described herein.

The sound source identification software application 123 can manage information about a plurality of different incoming and stored sound events and the sound genes that are associated with each sound event. In one embodiment, a sound gene, e.g., as described below a distance vector, can reside and/or be stored and accessed on the mobile device 130. In one embodiment, a sound gene can reside and/or be stored by or at the remote central intelligence unit 170 and accessed at a remote site. Additionally, or alternatively, sound genes associated with each sound event can be received as an SMS signal by a third party 900. The sound source identification system 110 therefore enables remote monitoring and can act as a remote monitoring device.

Figure 3:
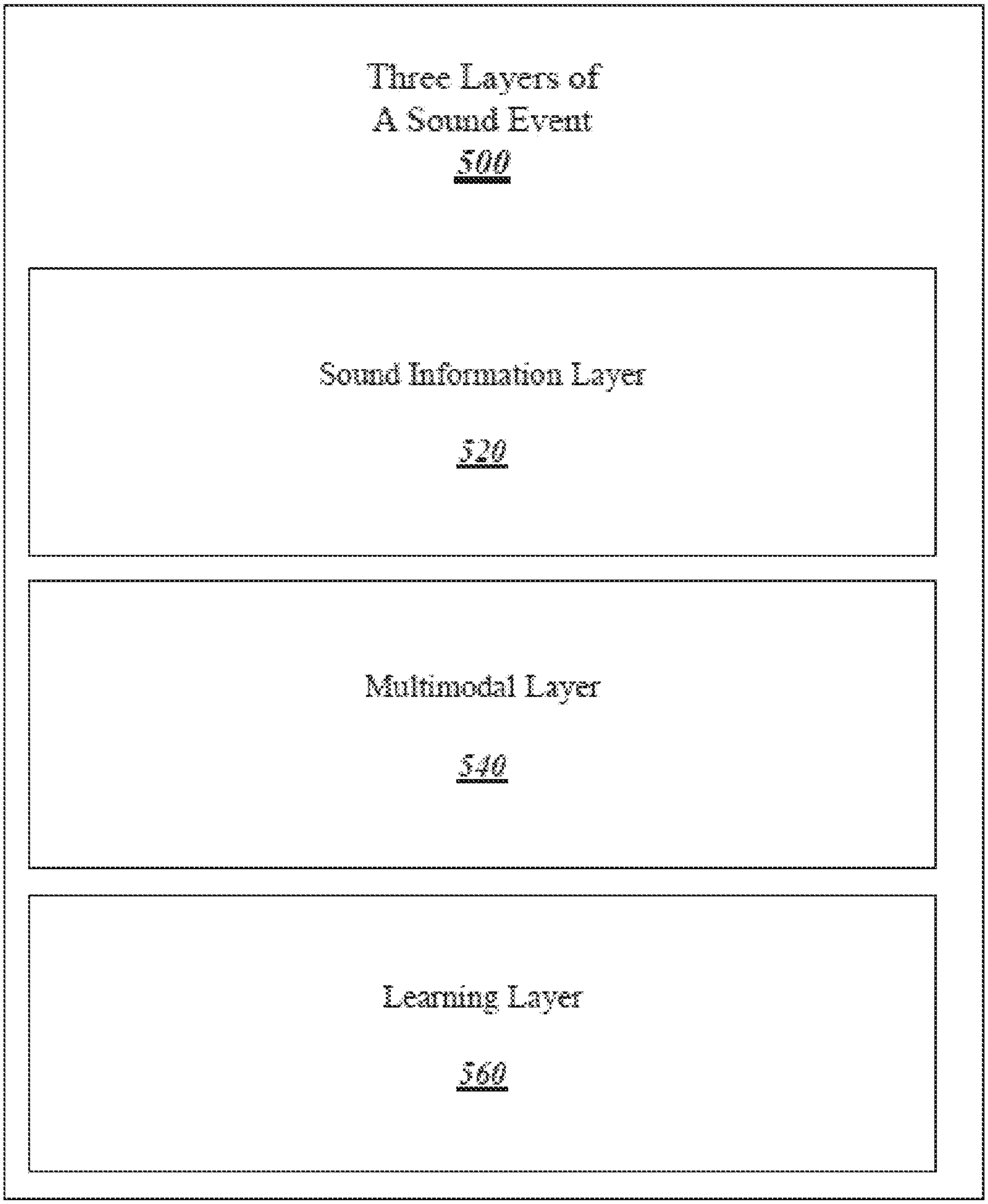
FIG. 3 is a schematic illustration of three different layers of a sound event: a sound information layer, a multimodal layer, and a learning layer.

In order to analyze an incoming sound event 190, the sound identification software can deconstruct each incoming sound event 190 into layers, as shown in FIG. 3, three layers. The three illustrated layers of a sound event 500 as identified and determined by the sound identification system include a sound information layer 520, a multimodal layer 540, and a learning layer 560, although other layers are also possible.

While each of the three layers is described in greater detail below, the sound information layer 520 represents audio-based characteristics or features of the sound event, the multimodal layer represents contextual or non-audio-based characteristics or features of the sound event, and the learning layer 560 can enable each reference sound event to execute a decision as to whether or not it is at least a part of an incoming sound event. To the extent any of the three layers described herein as being part of the sound event, a person skilled in the art will recognize that it is the system, e.g., the microprocessor 122 and/or analyzer 123 that actually identifies, discerns, and calculates the characteristics and values associated with each layer.

The sound information and multimodal layers can include any number of sound identification characteristics. In the described and illustrated embodiments, thirteen sound identification characteristics are provided for, nine of which are directly extracted from or otherwise derived from the received sound event, and are associated with the sound information layer, and four of which are contextual characteristics derived from information related to the sound event, and are associated with the multimodal layer. These characteristics are then used to derive distances input into an N-dimensional vector, which in one of the described embodiments is a 12-dimensional vector. The vector, also referred to herein as a sound gene, is then used to compare the perceived sound event to sound events stored in one or more databases. Any or all of these characteristics and/or distances can be used to identify the source of a sound event. The sound information layer generally contains the most relevant information about the sound of the targeted event. The values associated with the characteristics are typically designed to be neuromimetic and to reduce computations by the microprocessor 122 and analyzer 123.

Audio Chunks and Spectrums for Analyzing a Sound Event

Figure 4A:
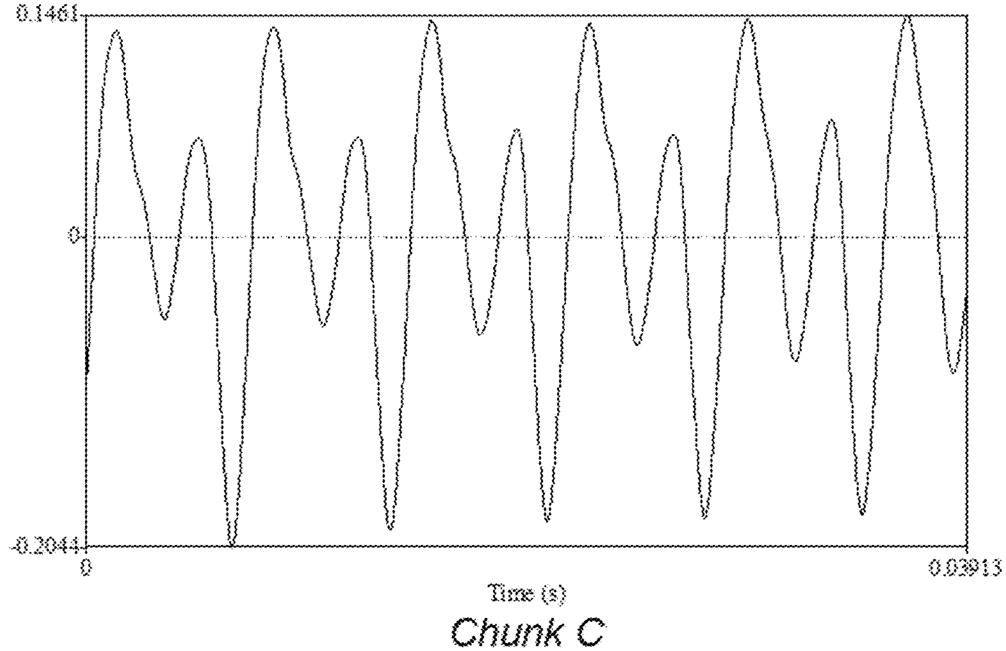
FIG. 4A is a graph illustrating a wavelength of a chunk of sound from a sound event over a period of time.

Prior to extracting or otherwise deriving the sound identification characteristics from the audio signal, the audio signal can be broken down into parts, referred to herein as audio chunks, time chunks, or chunks. The system 110 is generally designed to maintain a constant First-In, First-Out (FIFO) stack of History Length (HL) consecutive chunks of an incoming sound event. In one exemplary embodiment, each chunk of the audio signal is made from 2048 samples (i.e., 2048 is the buffer size), and the sound event is recorded at 44.1 kHz. As a result, each chunk represents approximately 0.46 ms of sound. The HL can be adjusted depending on the computing power available in the device 130. In one exemplary embodiment, the default value is set to HL=64 so the stack object represents approximately 3 seconds of sound (64 multiplied by 0.46 ms of sound ~3 seconds). FIG. 4A illustrates one example of a sound wave chunk, in which the chunk C extends approximately 0.46 ms. 64 of these chunks in a stack form the stack object, which represents approximately 3 seconds of sound.

While a person skilled in the art will recognize that a variety of values can be used for the buffer size, recording frequency, history length, and chunk size, and such values can depend, at least in part, on variables including but not limited to the amount of computer power of the system and whether the sound is being measured in real time, in some exemplary embodiments samples can be approximately in the range from about 500 samples to about 10,000 samples, a sample recording rate can be approximately in the range of about 5 kHz to about 50 kHz, a history length can be approximately in the range of about 16 to about 256 chunks, where a chunk time length is deduced from the sample number and the sample recording rate. Likewise, the stack object can represent a variety of sound lengths, and in some exemplary embodiments the stack object can represent a sound length approximately in the range of about 3 seconds to about 20 seconds.

Figure 4B:
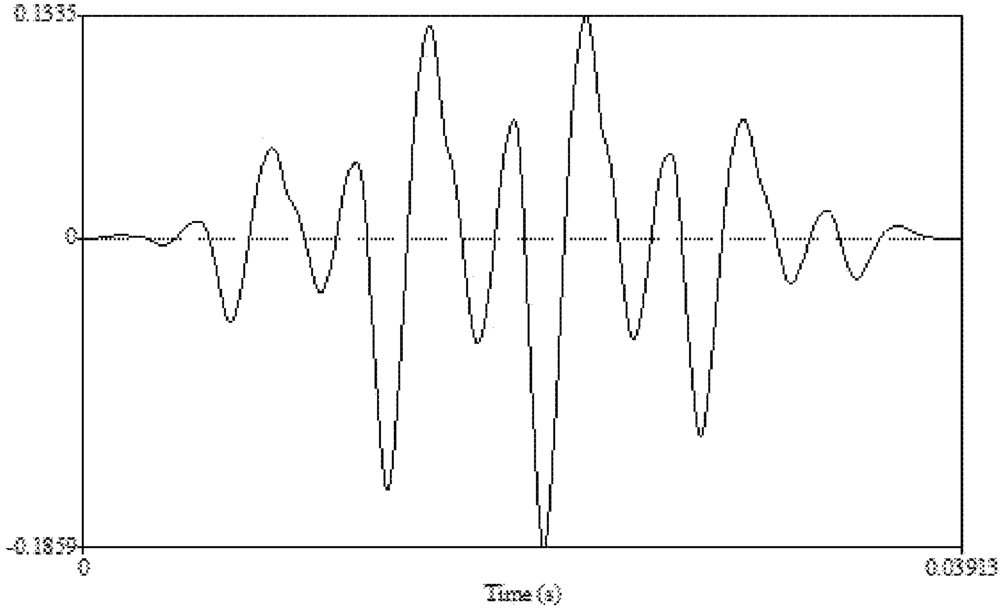
FIG. 4B is a graph illustrating the wavelength of the chunk of sound of FIG. 4A over the period of time after it is multiplied by a Hann window.

In order to improve the accuracy of the analysis by creating a smooth window at both the beginning and end of the chunk C, the chunk C is multiplied by a Hann window:

$$w(n) = 0.5\left(1 - \cos\left(\frac{2\pi n}{N-1}\right)\right) \tag{1}$$

where n is a little chunk and N is the number of samples, so 2048. The resulting graphic illustration of the chunk C from FIG. 4A multiplied by the Hann window is illustrated in FIG. 4B. As shown, the beginning and end of the chunk C are smooth, which helps avoid artifacts in the spectrum.

Figure 4C:
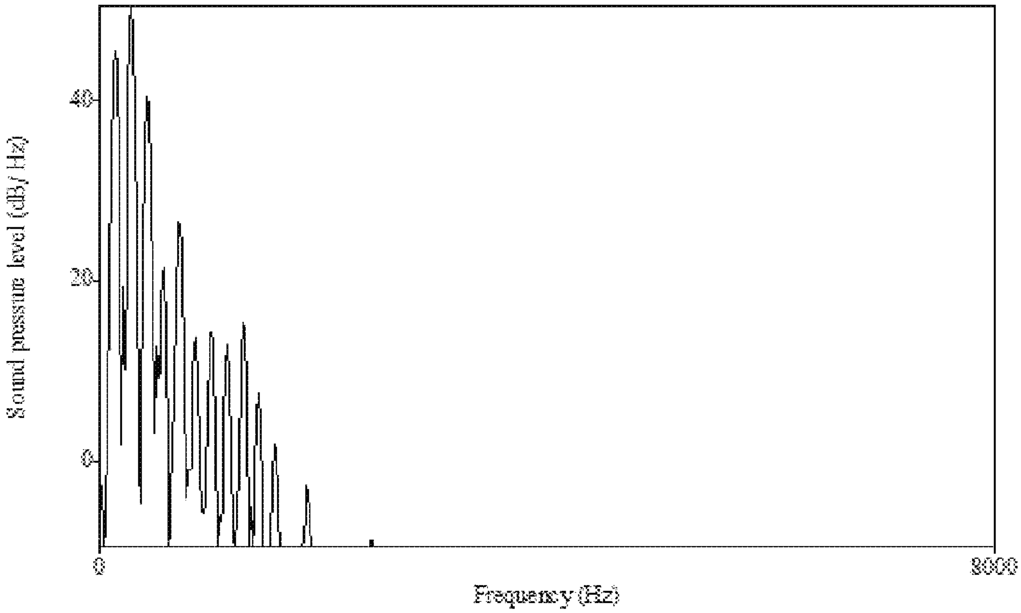
FIG. 4C is a graph illustrating a sound pressure level of the chunk of sound of FIG. 4B across the frequency of the chunk of sound after a Discrete Fourier Transform is performed on the chunk of sound, thus representing a spectrum of the sound event.

A Discrete Fourier Transform can then be performed on the chunk C, which creates what is referred to herein as a spectrum of the chunk C, and the frequency and power of the spectrum can be rescaled after factoring in a logarithmic ratio. The resulting graphic illustration of the spectrum of the chunk C after the Discrete Fourier Transform is performed is illustrated in FIG. 4C. As shown, the sound pressure level falls off as the frequency increases before any re-scaling is performed. A person skilled in the art will understand how the chunk C, and each of the 64 audio chunks for the sound event, can have a Discrete Fourier Transform performed on it to form 64 spectrums of the 64 audio chunks.

Figure 4D:
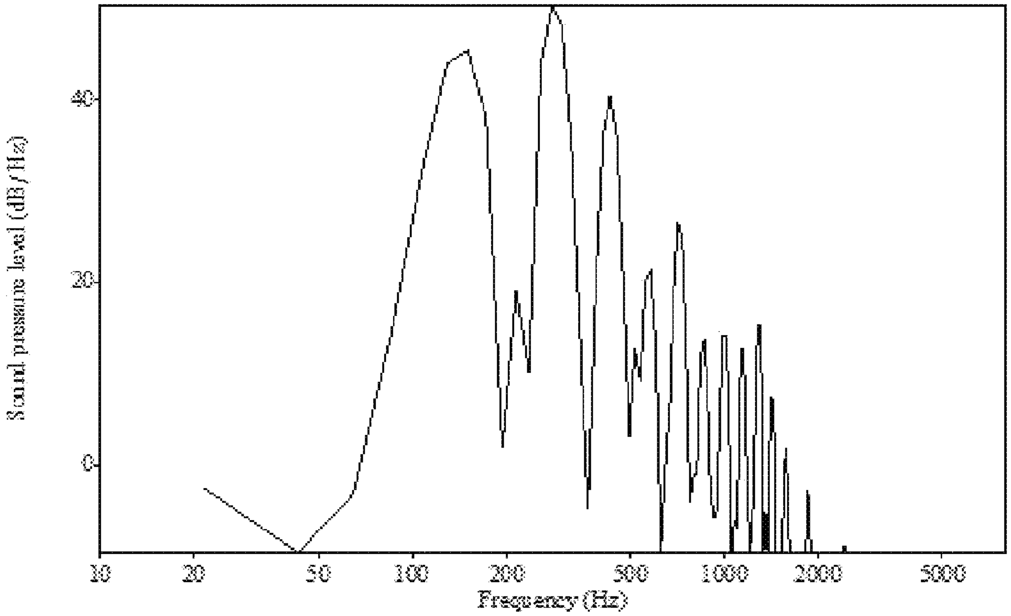
FIG. 4D is a graph illustrating the spectrum of the sound event of FIG. 4C after logarithmic re-scaling of the spectrum occurs.

Further, to enhance the illustration of the resulting graph of the spectrum of the chunk C following the Discrete Fourier Transform, the spectrum can be re-scaled by a logarithmic ratio, such as the Mel logarithmic ratio described below. The result of a re-scaling is illustrated in FIG. 4D. As shown, the sound pressure level is now illustrated over a smaller frequency, and better illustrates the change of the sound pressure level as the frequency increases for the spectrum. This re-scaling emphasizes low and medium frequencies, which is where human hearing is typically most sensitive to frequency variations.

Figure 4E:
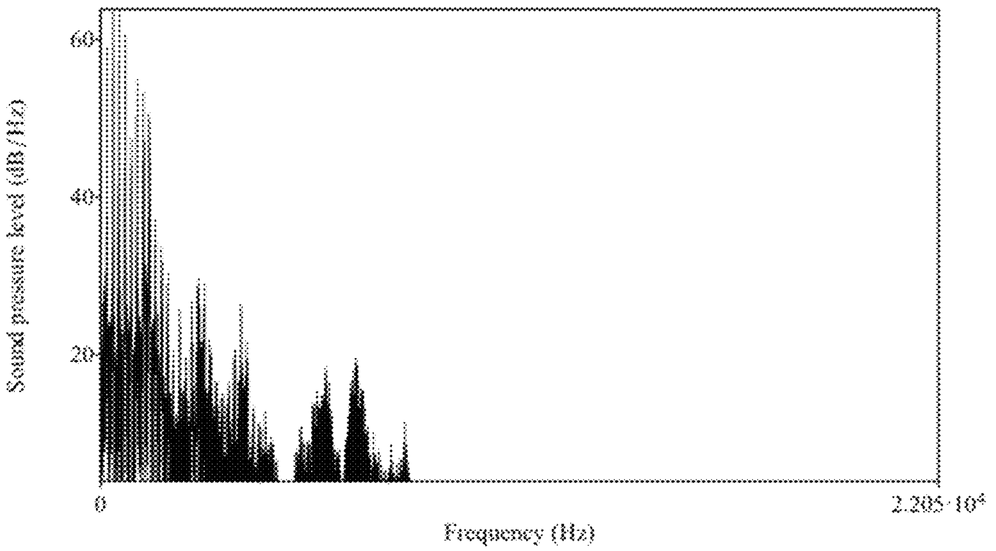
FIG. 4E is a graph illustrating a sound pressure level of a chunk of sound from a sound event across a frequency of the chunk of sound after a Discrete Fourier Transform is performed on the chunk of sound, thus representing a spectrum of the sound event, the frequency being measured in Hertz.
Figure 4F:
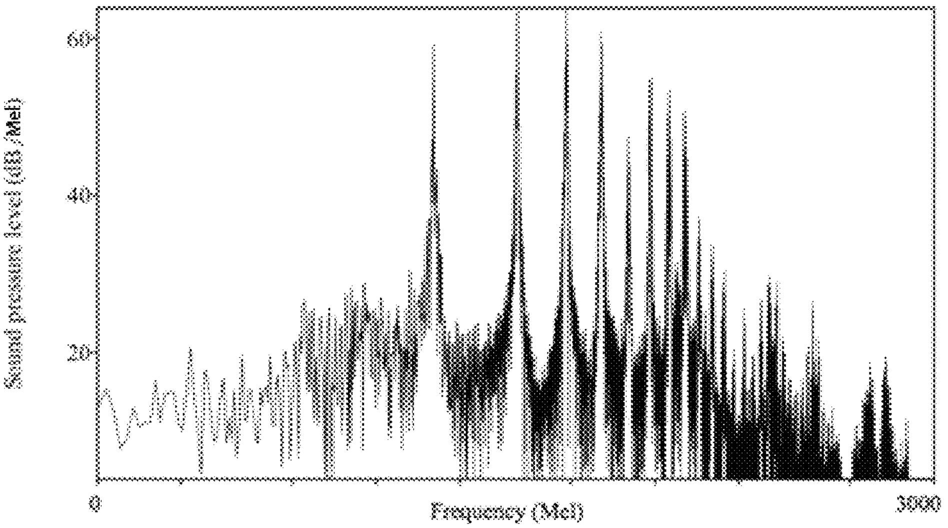
FIG. 4F is a graph illustrating the spectrum of the sound event of FIG. 4E after the frequency is converted from Hertz to Mel, and after logarithmic re-scaling of the spectrum occurs.

As indicated, in some instances it may be desirable to convert the re-scaled spectrum for the sound event from a scale involving a frequency measured in Hertz to a frequency measured in Mel. FIGS. 4E and 4F provide such an illustration. As shown in FIG. 4E, a spectrum of an audio chunk C' of a sound event is graphed showing a sound pressure level at various frequencies of the audio chunk, the frequency being measured in Hertz. This graphic illustration is similar to the graphic illustration provided in FIG. 4C, and thus represents a spectrum of an audio chunk C' after the chunk has been multiplied by a Hann window and has had a Discrete Fourier Transform performed on it to generate the spectrum. As illustrated, the sound pressure level starts high, and as frequency increases, sound pressure level drops. After the initial drop, there are approximately four undulations up and down in a sort of bell curve shape as the frequency increases. The illustrated graph in FIG. 4E can have the frequency converted to a Mel scale using the following equation:

$$m = 2595\log_{10}\left(1 + \frac{f}{700}\right) \tag{2}$$

where f represents the frequency in Hertz and m represents the frequency in Mel. The resulting graph of the spectrum of the audio chunk C' is provided for in FIG. 4F, after a logarithmic ratio is applied to re-scale the graph. This re-scaling, like the re-scaling performed between FIGS. 4C and 4D, emphasizes low and medium frequencies. As shown, the graph illustrates that the sound pressure level for this particular spectrum actually has a number of different undulations greater than four once viewed in the Mel scale. A person skilled in the art will recognize other ways by which re-scaling can be performed to emphasize low and medium frequencies.

Once each of the 64 audio chunks from a 3 second sound event have been subjected to the above processes, the result is a set of 64 audio chunks, sometimes referred to as an Audio Set, and a set of 64 consecutive log-spectrums, sometimes referred to as a Spectrum Set. From these two sets of data, a number of different characteristics can be extracted from each sound event. The characteristics form one or more sound genes, and the genes make up the sound information layer 520 of the sound event 500. Each can gene can include one or more characteristics, as described below, and/or one or more measurements of a "distance" of those characteristics, as also described below, any and all of which can be used to identify a source of a sound event.

Sound Identification Characteristics for the Sound Layer

Figure 5:
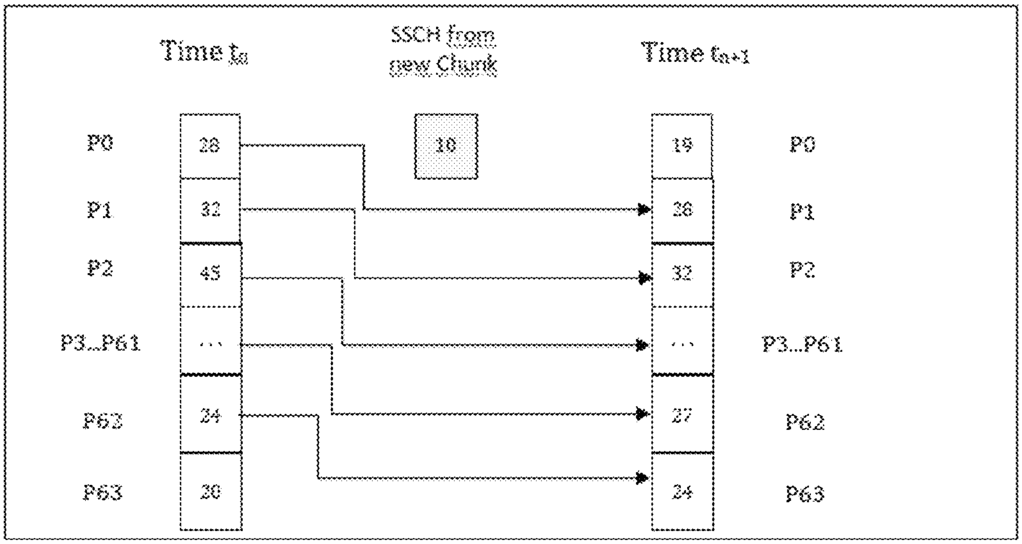
FIG. 5 is a schematic illustration of processing of multiple chunks of sound over time to determine a Soft Surface Change History.

A first sound identification characteristic is a Soft Surface Change History (SSCH). SSCH is a FIFO stack of HL numbers based on the audio chunks and provides a representation of the power of the sound event. In the example provided for herein, the HL is 64, so the stack is of 64 numbers derived from the 64 audio chunks, which are 0 to 63 as illustrated in FIG. 5. For each new audio chunk processed by the system 110, the logarithm of the surface of the absolute value of the chunk waveform, i.e., the chunk as illustrated in FIG. 4B before any Discrete Fourier Transform is applied to provide a spectrum of the chunk, is processed and then pushed in the stack based on the following equation:

$$P0_{t_{n+1}} = P0_{t_n} - \frac{P0_{t_n} - P_{temp}}{FF} \quad (3)$$

where $$P0_{t_{n+1}}$$

is the most recent audio chunk, $$P0_{t_n}$$

is the audio chunk directly preceding the most recent audio chunk, $P_{temp}$ is the logarithm of the surface of the absolute value of the most recent audio chunk, and FF is a friction factor. In one exemplary embodiment, the FF has a value of 5, although a person skilled in the art will recognize that the FF can have any number of values, including approximately in a range of about 1 to about 50. The higher the friction factor is, the less a given variation of $P_{temp}$ will affect $$P0_{t_{n+1}}.$$

The equation is designed to act as a local smoothing algorithm and make SSCH a series of numbers representing a value in relation to the variations of the signal global power over time.

FIG. 5 provides an illustration of how the SSCH calculation is processed. As each individual chunk of the 64 chunks is added to the stack, an absolute value for that chunk is calculated, and the absolute value of the previously added chunk is pushed down the stack. The arrows extending from each box having the absolute value for that particular chunk disposed therein illustrates that the box is pushed one spot further down the stack as a new audio chunk is added to the stack. The absolute value of the most recent audio chunk is calculated, and then a new chunk is processed in the same manner. Because there is no previous audio chunk to process when the first audio chunk is received, the absolute value for the previous audio chunk is arbitrarily set to some number that is not 0. Further, because there are a finite number of absolute values in the stack, as shown in the present embodiment 64 because the HL is 64, the last value from the previous chunk falls out of the stack once a new audio chunk is added. This is illustrated in FIG. 5 by the absolute value of 20 in the column associated with $t_n$, which represents the next most recent audio chunk added to the stack after the newest audio chunk is added to the stack, not being found in the column associated with $t_{n+1}$, which represents the newest audio chunk added to the stack. The SSCH provides a good representation of the power of the sound event because it uses a logarithmic value. In alternative embodiments, the calculation for the SSCH of each audio chunk can be performed quadratically.

A second sound identification characteristic is a Soft Spectrum Evolution History (SSEH). SSEH is a FIFO stack of HL vectors, with each vector having a length that is equal to the buffer size divided by two, and is composed of real numbers based on the spectrums derived from the audio chunks, i.e., the spectrums as illustrated in FIG. 4D. In the described embodiment, the buffer is 2048, and thus because the spectrum is half the size of the buffer, the vectors in SSEH are each 1024 real numbers long. For each new spectrum computed from a new audio chunk, a new vector is pushed into SSEH as shown in the following equation:

$$V_{t_{n+1}} = V_{t_n} - \frac{V_{t_n} - S}{FF} \quad (4)$$

where $V_{t_{n+1}}$ is the vector from the most recent audio spectrum, $V_{t_n}$ is the vector from the spectrum comparison performed directly preceding the most recent spectrum, S is the vector from the most recent audio chunk from which the most recent audio spectrum is determined, and FF is a friction factor. In one exemplary embodiment, the FF has a value of 5, although a person skilled in the art will recognize that the FF can have any number of values, including approximately in a range of about 1 to about 50. The higher the friction factor is, the lower the impact will be of the instant spectrum variations on the new SSEH vector. In general, the equation operates by comparing the vector value of the most recent spectrum to the vector value of the spectrum directly preceding the most recent spectrum, then dividing the difference between those values by the FF to arrive at a new value for use in comparing the next new spectrum. SSEH is intended to carry information about the spectrum evolution over time and its computation acts as a smoothing algorithm.

Figure 6:
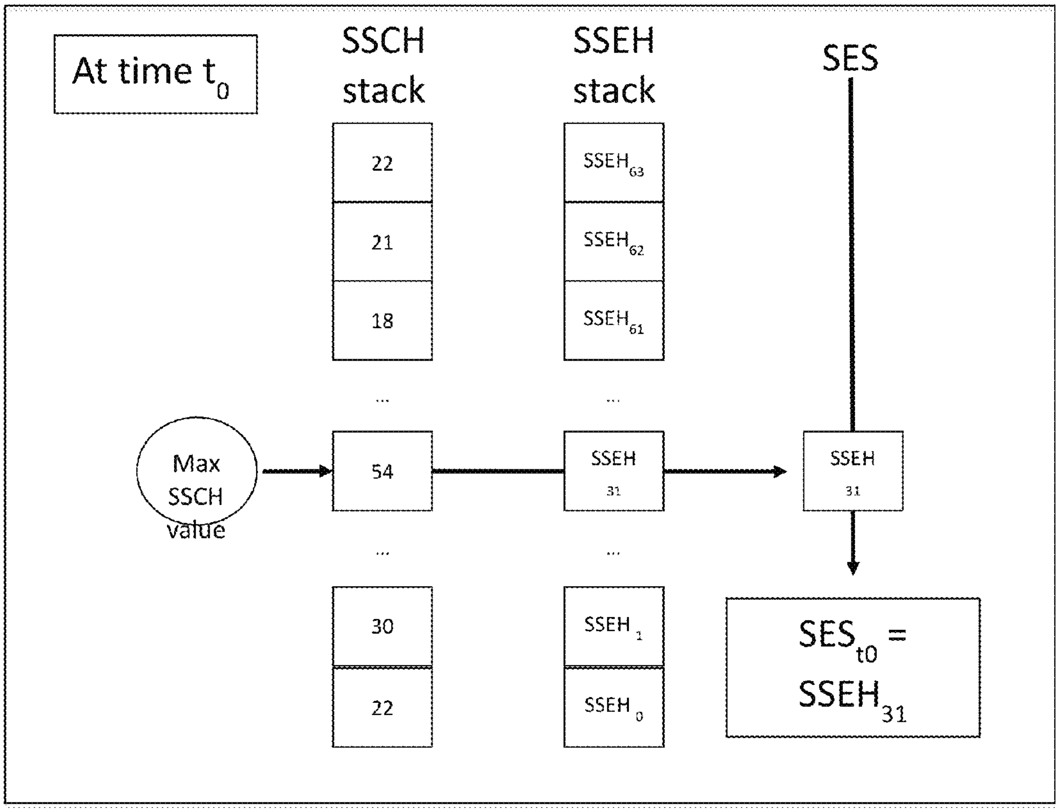
FIG. 6 is a schematic illustration of a stack of Soft Surface Change History values for a sound event and a corresponding stack of Soft Spectrum Evolution History graphs.

A third sound identification characteristic is a Spectral Evolution Signature (SES). SES is the vector of SSEH corresponding to the maximal SSCH. Accordingly, to determine the SES for a sound event, the 64 SSCH values for a sound event are stacked, as shown in FIG. 6 with the 64 SSCH values being the column displayed on the left, and the single maximum SSCH value for the stack is identified. Based on that determination, the spectrum graph associated with the maximum SSCH (the equivalent graph of FIG. 4D for the spectrum having the single maximum SSCH value for the stack), as also shown in FIG. 6 with the 64 spectrum graphs (identified by $SSEH_0$-$SSEH_{63}$ for illustrative purposes) being the column displayed on the right, is used to identify the vector of SSEH associated with that same audio chunk/spectrum. In other words, the SES is the vector of SSEH from the spectrum associated with the audio chunk having the greatest SSCH value of the 64 audio chunks. In the illustrated embodiment, the greatest SSCH value is 54, and the related SSEH graph is the one associated with $SSEH_{31}$. Thus, the spectrum associated with $SSEH_{31}$ is the spectrum used to the SES, as illustrated by the arrow extending from the box having the value 54 in the first column to the complementary graph provided in the second column.

A fourth sound identification characteristic is a Main Ray History (MRH). MRH is a FIFO stack of HL numbers in which the determination of each element of the MRH is based on the spectrum for each chunk, i.e., the spectrum as illustrated in FIG. 4D. Each element of MRH is the frequency corresponding to the highest energy in the corresponding spectrum in SSEH. Accordingly, the MRH for the spectrum illustrated in FIG. 4D is approximately 300 Hz.

Figure 7:
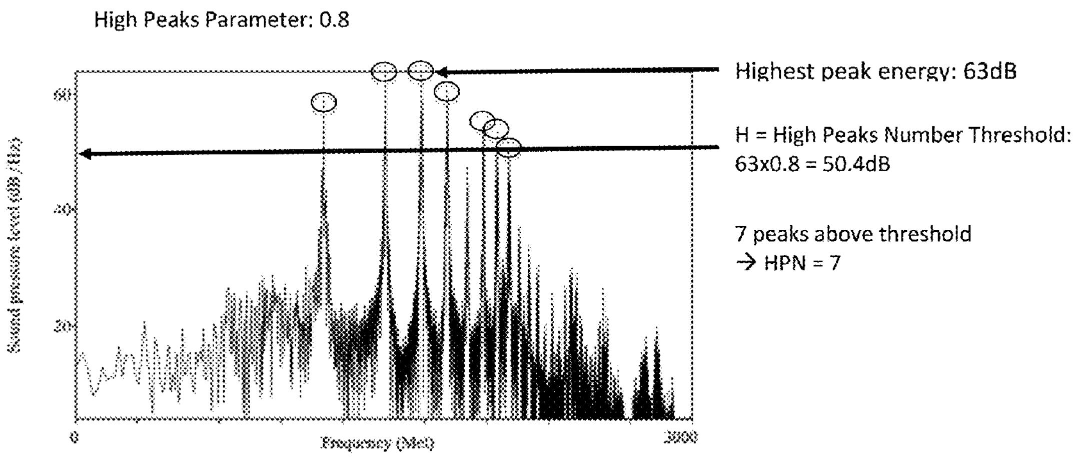
FIG. 7 is the graph of FIG. 4F, the graph including a High Peaks Parameter for determining a High Peaks Number for the spectrum.

A fifth sound identification characteristic is a High Peaks Number (HPN). HPN is the ratio of spectrum values comprised between the maximum value and the maximum value multiplied by the High Peaks Parameter (HPP), where the HPP is a number between 0 and 1 that defines a horizontal line on the spectrum above which any value qualifies as a value to determine the HPN. More particularly, if the HPP is 0.8, then the maximum value of the sound pressure level for a spectrum is multiplied by 0.8, and then a horizontal line is drawn for the sound pressure level that is 0.8 times the maximum value of the sound pressure level for the spectrum, i.e., 80% of that value. For example, in the spectrum illustrated in FIG. 7, the maximum value of the sound pressure level is approximately 63 dB, and thus when the HPP is 0.8, a horizontal line H used to help define the HPN is drawn at 50.4 dB (50.4 dB=63 dB*0.8). Any of the 2048 samples for that spectrum that has a sound pressure level greater than 50.4 dB, i.e., any that is above the horizontal line H, qualifies as one value for the HPN. The number of samples that are greater than 50.4 dB is then totaled and divided by the total number of samples, leading to the HPN. In the example provided, HPN is 50.4 divided by 2048 samples, yielding 0.0246 dB/sample. When totaling, each sample that qualifies just counts as "1," and thus a user is not totaling the actual sound pressure level value. Accordingly, in the illustrated embodiment, 7 peaks are above the threshold established by the horizontal line H, and thus the HPN is 7. The HPN is closely related to a signal-to-noise ratio. It can be used to help identify between pure tone and white noise, which are at opposite ends of the spectrum. The lower the HPN is, the less noise there is associated with the sound event.

Figure 8:
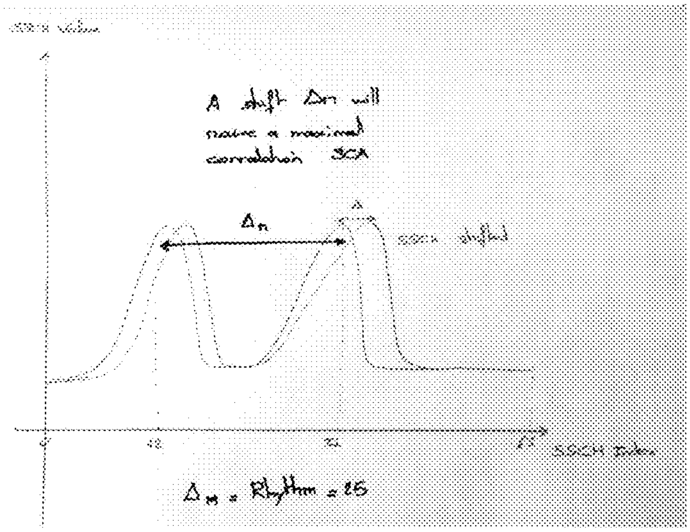
FIG. 8 is a graph illustrating an audio signal associated with a sound event illustrating Soft Surface Change History values, and the audio signal shifted by a parameter Δ for purposes of determining a Surface Change Autocorrelation.

A sixth sound identification characteristic is a Surface Change Autocorrelation (SCA). SCA measures a surface change that correlates to an intensity change. SCA is the result of the autocorrelation of SSCH, realized by computing correlation C(Δ) between SSCH and a circular permutation of SSCH with a shift Δ, $SSCH_\Delta$. The shift can vary from approximately 0 to approximately HL/2, with steps of approximately HL/1. SCA is the maximal value of C(Δ). In other words, for each audio chunk, the audio chunk is graphed, and then the graph is shifted by a distance Δ, as illustrated in FIG. 8. In some embodiments, such as the described embodiment in which HL is 64, the line on the graph is shifted 1/64 forward along the X-axis and the resulting SSCH is compared to the previous SSCH by performing a Pearson correlation, which is known to those skilled in the art as being defined as, for the present two distributions of two variables:

$$r = \frac{\sum_{i=1}^{n}(X_i - \bar{X})(Y_i - \bar{Y})}{\sqrt{\sum_{i=1}^{n}(X_i - \bar{X})^2}\sqrt{\sum_{i=1}^{n}(Y_i - \bar{Y})^2}} \tag{5}$$

where X=SSCH and $Y=SSCH_\Delta$. A high correlation of intensity would be in instance in which the shifted line has a similar shape to the original, un-shifted line, indicating that the intensity is being repeated to form a rhythm. Each of the up to 64 values that result from the Pearson correlations is stored for the auto-correlation graph, and the value that is greatest of those 64 is saved as the SCA value for that sound event. The resulting value helps identify the existence of a rhythm of the sound event.

A seventh sound identification characteristic is a Rhythm. Rhythm is set as the number Δ for which SCA, i.e., C(Δ), is maximal multiplied by the HL. In other words, the number of shifts that were performed in order to achieve the SCA. So if 20 shifts were performed before the second correlation of intensity was determined, Δ is 20/64 and then the value for the seventh sound identification characteristic is 20 (20/64 multiplied by HL being 64=20). In the embodiment illustrated in FIG. 8, the rhythm is 25.

An eighth sound identification characteristic is a Brutality, Purity, Harmonicity (BRH) Set. This characteristic is a triplet of numbers that provides a non-linear representation of three grandeurs of a sound event, as shown in the following equations:

$$\text{Let } f(x) = 3x^2 - 2x^3 (\text{step function}) \tag{6}$$

$$\text{Rhythmicity} = f(SCA) \tag{7}$$

$$\text{Purity} = f(1 - HPN) \tag{8}$$

$$\text{Brutality} = f\left(\frac{LTSC}{\max(SSCH)}\right) \tag{9}$$

where SCA is Surface Change Autocorrelation as discussed above with respect to a sixth sound identification characteristic, HPN is a High Peaks Number as discussed above with respect to a fifth sound identification characteristic, LTSC is Long Term Surface Change, which is the arithmetic mean of SSCH values over the whole SSCH stack, and max (SSCH) is the max change of the Soft Surface Change History for the audio chunk. The step function is used for each of the pieces of information to get closer to a psychoacoustic experience. Rhythmicity measures a rhythm of the sound event, purity measures how close to a pure tone the sound event is, and brutality measures big changes in intensity for the sound event.

A ninth sound identification characteristic is a Pulse Number (PN). PN represents the number of pulses that exist over the approximately three second sound event. As provided for herein, PN is the number of HL/N windows of SSCH that are separated by at least HL/N points and that satisfy the following equations:

$$\left(\sum_{i=k}^{i=k+HL/N} SSCH_k\right) < \text{Max}(SSCH)/T_1 \tag{10}$$

$$\text{Max}(SSCH_i) > \text{Max}(SSCH)/T_2,\ i \in \left[k; k+\frac{HL}{N}\right] \tag{11}$$

where k is the position of the window, HL is 64 in the illustrated example, N is 16 in the illustrated example, $T_1$ is a first threshold value (for example, 16), $T_2$ is a second threshold value (for example, 4), and SSCH represents the Soft Surface Change History. A pulse means a brutal increase in signal power closely followed by a brutal decrease to a level close to its original value. As SSCH is a stack of values representing the change in a signal's power, a pulse can be represented in SSCH by a short positive peak immediately followed by a short negative peak. In terms of SSCH, a pulse can therefore be defined as a short interval in SSCH of width HL/N where there are values high enough to indicate a noticeable event (highest value in the window over the maximal value across the whole SSCH divided by $T_2$) and where the sum of SSCH values over this window is close to zero (e.g., under a given threshold corresponding to the maximum value in SSCH divided by $T_1$), as the global energy change over the window should be null. In some embodiments $T_1$ can be set approximately the range of about 8 to about 32 and $T_2$ can be set approximately in the range of about 2 to about 5. A person skilled in the art will recognize that other values for $T_1$ and $T_2$ are possible.

Figure 9:
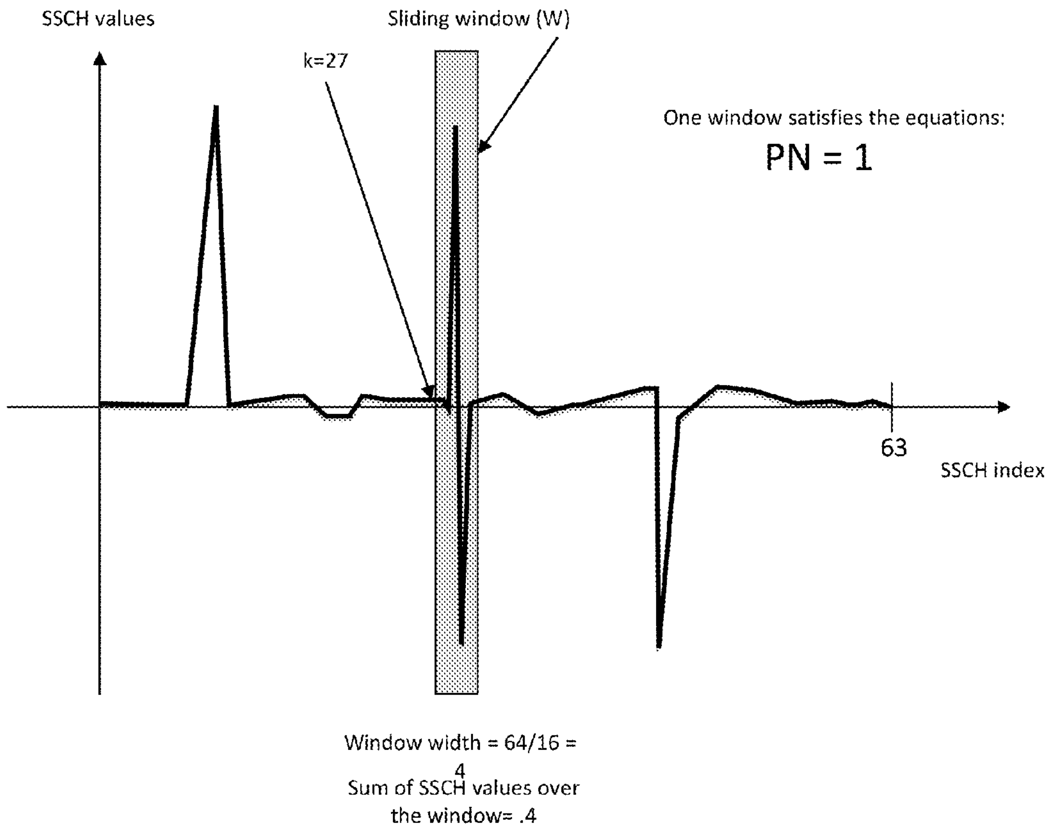
FIG. 9 is a graph of an audio signal associated with a sound event illustrating Soft Surface Change History values, and a sliding window used to determine a Pulse Number.

In FIG. 9, an SSCH corresponding to a sound event is illustrated in which there is a rise in signal power at the beginning, a pulse in the middle, and a fall at the end. The sum of SSCH values when the sliding window W contains the pulse will be low despite the presence of high values in it, and thus at this instance the equations are satisfied and thus a pulse is identified. Notably, the absolute value of the section is not generally equal to 0 because any section in which no change to the sound event pulse occurred could also yield a 0 result, and section where no pulse existed should be counted in determining the PN. Further, each section that qualifies just counts as "1." Thus, in the illustrated embodiment, the PN is 1 because only one of the middle windows has an absolute value that is approximately 0. As a general premise, the PN identifies low values of surface change integrated over a small window.

While the present disclosure provides for nine sound identification characteristics, a person skilled in the art will recognize that other sound identification characteristics can be extracted or otherwise derived from a received audio signal. The nine provided for above are not a limiting number of sound identification characteristics that can be used to form one or more sound genes and/or can be used in the learning layer and/or as part of the inferential engine.

Further, as discussed below with respect to the learning layer, some of the sound identification characteristics provided for herein are more useful as part of the sound layer of a sound event than others, while other sound identification characteristics provided for herein are more useful for use in conjunction with an inferential engine used to determine a sound event that is not identifiable by comparing characteristics or genes of the perceived sound event and the sound event(s) stored in one or more databases. For example, the HPN, Rhythm, and BRH Set (one, two, or all three pieces of information associated therewith) can be particularly useful with an inferential engine because they provide easily identifiable numbers assigned to a sound event to help identify characteristics that may be important to identifying a sound event that has an unknown source after comparing the sound event to sound events stored in any databases associated with the system.

Sound Identification Characteristics for the Multimodal Layer

The second layer of the sound event 500 is a multimodal layer 540. The multimodal layer is a layer that includes contextual information about the perceived sound event. While a wide variety of contextual information is attainable from the environment surrounding the sound event, the present disclosure provides four for use in making sound event determinations. The four characteristics are: (1) location, which can include a 4-dimension vector of latitude, longitude, altitude, and precision; (2) time, which can include the year, month, day, day of the week, hour, minute, and second, among other time identifiers; (3) acceleration, which can be a determination of the acceleration of the mobile device 130 that receives the sound event; and (4) light intensity, which analyzes the amount of light surrounding the mobile device 130. A person skilled in the art will recognize other information that can fall within these four categories and can be used to help identify a sound, including, by way of non-limiting example, a season of the year can be a time characteristic that is useful as contextual information for sound source identification.

Figure 10:
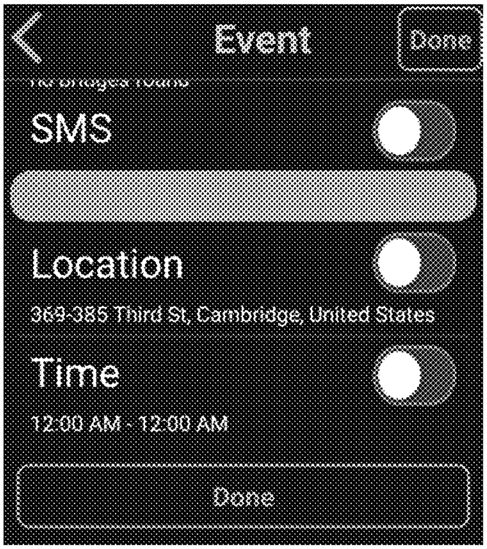
FIG. 10 is a screen capture of a display screen illustrating a user interface for providing location information about a sound event.

The location contextual information can be determined using any number of instruments, devices, and methods known for providing location-based information. For example, the mobile device 130 can have Global Positioning System (GPS) capabilities, and thus can provide information about the location of the user when the sound event was perceived, including the latitude, longitude, altitude, and precision of the user. The contextual information can also be more basic, for instance a user identifying the location at which a sound event was perceived, such as at the user's house or the user's office. One exemplary embodiment of an input screen that allows a user to input a location at which the perceived sound event occurred is illustrated in FIG. 10. The location can be directly determined by a localization system built into the receiving device, e.g., a mobile phone. In other embodiments, a user can enter a location.

Figure 11:
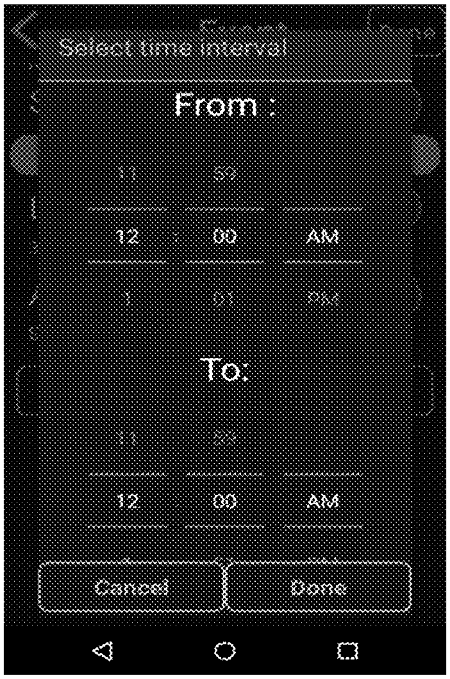
FIG. 11 is a screen capture of a display screen illustrating a user interface for providing time information about a sound event.

The time contextual information can likewise be determined using any number of instruments, devices, and methods known for providing time information. For example, the user can program the date and time directly into his or her mobile device 130, or the mobile device 130 can be synched to a network that provides the date and time to the mobile device 130 at the moment the sound event is perceived by the user. One exemplary embodiment of an input screen, provided for in FIG. 11, allows a user to input a range of times during which the perceived sound event typically occurs. Other interfaces allowing for the entry of a time or range of times can also be used.

The acceleration contextual information can also be determined using any number of instruments, devices, and methods known for providing acceleration information. In one exemplary embodiment, the mobile device 130 includes an accelerometer, which allows the acceleration of the mobile device 130 to be determined at the time the sound event is perceived by the user.

The light intensity contextual information can be determined using any number of instruments, devices, and methods known for analyzing an amount of light. In one exemplary embodiment, the mobile device 130 includes a light sensor that is able to provide information about the amount of light surrounding the mobile device at the time the sound event is perceived by the user. In some embodiments, the light sensor can be capable of analyzing the amount of light even when the device is disposed in a pocket of a user such that the location in the pocket does not negatively impact the accuracy of the contextual information provided about the amount of light.

Each of these four types of contextual information can provide relevant information to help make determinations as to the source of a sound event. Depending on where a person is located, the day and time a sound event occurs, whether the person is moving at a particular pace, or the amount of light in a surrounding environment can make the likelihood of particular sources more or less likely. For example, a buzzing sound heard at five o'clock in the morning in a dark room in a person's home is more likely to be an alarm clock than a door bell.

Further, a person skilled in the art will recognize other instruments, devices, and methods that can be used to obtain the contextual information described herein. Likewise, a person skilled in the art will recognize other contextual information that can be attained for use in making a determination of a source of a sound event, and the instruments, devices, and methods that can be used to attain other such information.

Learning Layer

The third layer of a sound event is a learning layer 560. As described above, the sound event 500 includes a number of objects describing the event, including the characteristics of the sound information layer 520 and the contextual information or characteristics associated with the multimodal layer 540. Thus, the sound event 500 can be described as an N-Dimensional composite object, with N based on the number of characteristics and information the system uses to identify a sound event. In the embodiment described below, the perceived sound event and the sound events in the database are based on 12-Dimensional composite objects, the 12 dimensions being derived from a combination of characteristics from the sound information layer and the multimodal layer of the sound event. The learning layer is also designed to optimize a decision making process about whether the perceived sound event is the same sound event as a sound event stored in one or more databases, sometimes referred to as a Similarity Decision, as described in greater detail below.

Distance Measuring Aspect of the Learning Layer

A distance function is used to compare one dimension from the perceived sound event to the same dimension for one or more of the sound events stored in one or more databases. Examples of the different dimensions that can be used are provided below, and they generally represent either one of the aforementioned characteristics, or a value derivable from one or more of the aforementioned characteristics. The relationship across the entire N-dimensions is compared to see if a determination can be made about whether the perceived sound event is akin to a sound event stored in the one or more databases. The distance comparison is illustrated by the following equation:

$$\delta(SE_P, SE_D) = \begin{vmatrix} d1 \\ d2 \\ \ldots \\ dN \end{vmatrix} \quad (12)$$

in which $\delta(SE_P,SE_D)$ is a distance vector between a perceived sound event ($SE_P$) and a sound event stored in a database ($SE_D$), the distance vector having N-dimensions for comparison (e.g., 12). In some exemplary embodiments, each of the distances has a value between 0 and 1 for that dimension, with 0 being representative of dimensions that are not comparable, and 1 being representative of dimensions that are similar or alike.

A first distance d1 of the distance vector can be representative of a Soft Surface Change History Correlation. The Soft Surface Change History Correlation is designed to compare the measured SSCH values of the perceived sound event $SE_P$, which as described above can be 64 values in one exemplary embodiment, to the stored SSCH values of a sound event $SE_D$ stored in a database. Measured SSCH values are the first characteristic described above. In some embodiments, the values stored for either the perceived sound event $SE_P$ or the stored sound event $SE_D$ can be shifted incrementally by a circular permutation to insure that no information is lost and that the comparison of values can be made across the entire time period of the sound event. The comparison is illustrated by the following equation:

$$d1=\mathrm{Max}[\mathrm{Correlation}(SSCH_P,SSCH_D,\sigma),\sigma\epsilon[0,HL] \quad (13)$$

where $SSCH_P$ represents the SSCH values for the perceived sound event, $SSCH_D$ represents the SSCH values for a sound event stored in a database, $\sigma$ is a circular permutation of $SSCH_D$ (or alternatively of $SSCH_P$) with an incremental shift, the Correlation refers to the use of a Pearson correlation to determine the relationship between the two sets of values, and the Max refers to the fact that the use of the incremental shift allows for the maximum correlation to be determined. In one exemplary embodiment, the incremental shift is equal the number of stored SSCH values, and thus in one of the embodiments described herein, the incremental shift is 64, allowing each SSCH value for the perceived sound event to be compared to each of the SSCH values for the sound event stored in the database by way of a Pearson correlation at each incremental shift. As a result, it can be determined where along the 64 shifts the maximum correlation between the two sound events $SE_D$, $SE_P$ occurs. Once the maximum correlation is identified, it is assigned a value between 0 and 1 as determined by the absolute value of the Pearson correlation and stored as the d1 value of the distance vector. This comparison can likewise be done between the perceived sound event $SE_P$ and any sound event stored in one or more databases as described herein.

Figure 12:
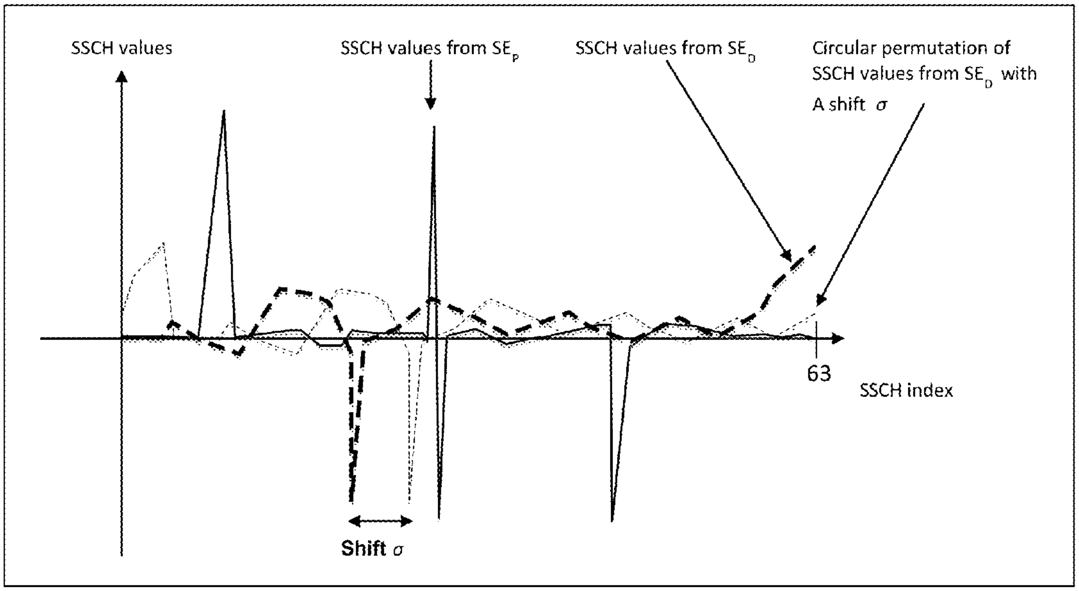
FIG. 12 is a graph illustrating Soft Surface Change History values for a perceived sound event and a sound event stored in a database, which relates to determining a distance d1 between the two sound events.

An example of the determination of d1 based on graphs of the SSCH values is illustrated in FIG. 12. As shown, each of 64 SSCH values for the perceived sound event $SE_P$ are illustrated as a solid line, and each of the 64 SSCH values for a sound event $SE_D$ stored in the database are illustrated as a first dashed line. A Pearson correlation is performed between the two sets of values to express how the two graphs move together. One of these two lines is then shifted incrementally 64 times to determine at which of the 64 locations the two lines correlate the most, illustrated by a second dashed line (lighter and shorter dashes than the first dashed line). The resulting maximum Pearson correlation value is a value between 0 and 1 that is stored as d1 in the distance vector.

Figure 13:
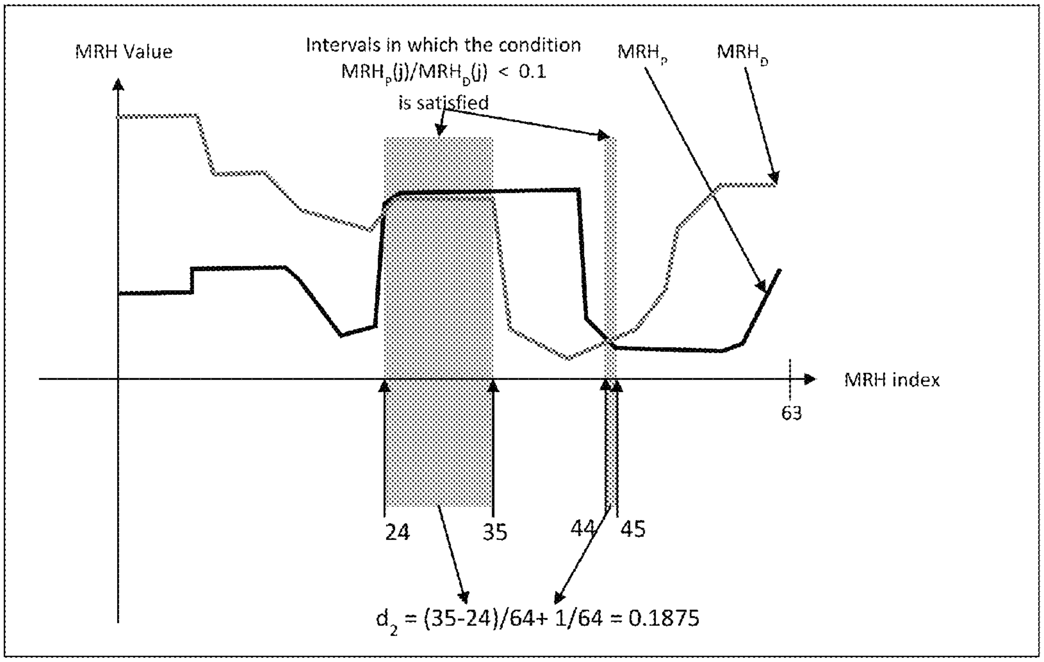
FIG. 13 is a graph illustrating Main Ray History values for a perceived sound event and a sound event stored in a database, which relates to determining a distance d2 between the two sound events.

A second distance d2 of the distance vector can be representative of Main Ray Histories Matching. Main Ray Histories Matching is designed to compare the identified main ray for each of the spectrums of a perceived sound event $SE_P$ (64 in one exemplary embodiment) against the identified main ray for each of the spectrums of a sound event $SE_D$ stored in a database. A sound event's main ray history is the fourth characteristic described above. As shown in FIG. 13, the identified main ray for each of the 64 spectrums of a perceived sound event $SE_P$ can be plotted to form one line, identified by $MRH_P$, and the identified main ray for each of the 64 spectrums of a sound event $SE_D$ stored in a database can be plotted to form a second line, identified by MRH. A condition can then be set-up to identify which of the 64 main history rays for each of the perceived sound event $SE_P$ and the sound event $SE_D$ stored in a database meet the condition, as shown in the following equation:

$$d2 = \frac{\text{number of } j \text{ satisfying} \left(\frac{MRH_P[j]}{MRH_D[j]}\right) < 0.1}{HL} \quad (14)$$

where the condition is that for each main ray history of the first sound event $MRH_P[j]$ at a given index j in the stack divided by the corresponding $MRH_D[j]$ of the same index of the second event is inferior to 0.1, 1/HL is added to the distance d2 (with HL being 64 in the described embodiment). Accordingly, in the illustrated embodiment 12 main rays of the perceived sound event satisfy the condition, and thus $12/64=0.1875$ is stored as d2 in the distance vector.

A third distance d3 of the distance vector can be representative of Surface Change History Autocorrelation Matching. Surface Change History Autocorrelation is designed to compare the measured SCA values of the perceived sound event $SE_P$, which as described above can be 64 values in one exemplary embodiment, to the stored SCA values of a sound event $SE_D$ stored in a database. Measured SCA values are the sixth characteristic described above. This comparison can help identify features of a sound event often more recognizable to a listener, such as rhythm, and is illustrated by the following equation $$d3=\text{Correlation}(SCA_P,SCA_D) \quad (15)$$

where $SCA_P$ represents the SCA values for the perceived sound event, $SCA_D$ represents the SCA values for a sound event stored in a database, and the Correlation refers to the use of a Pearson correlation to determine the relationship between the two sets of values.

Figure 14:
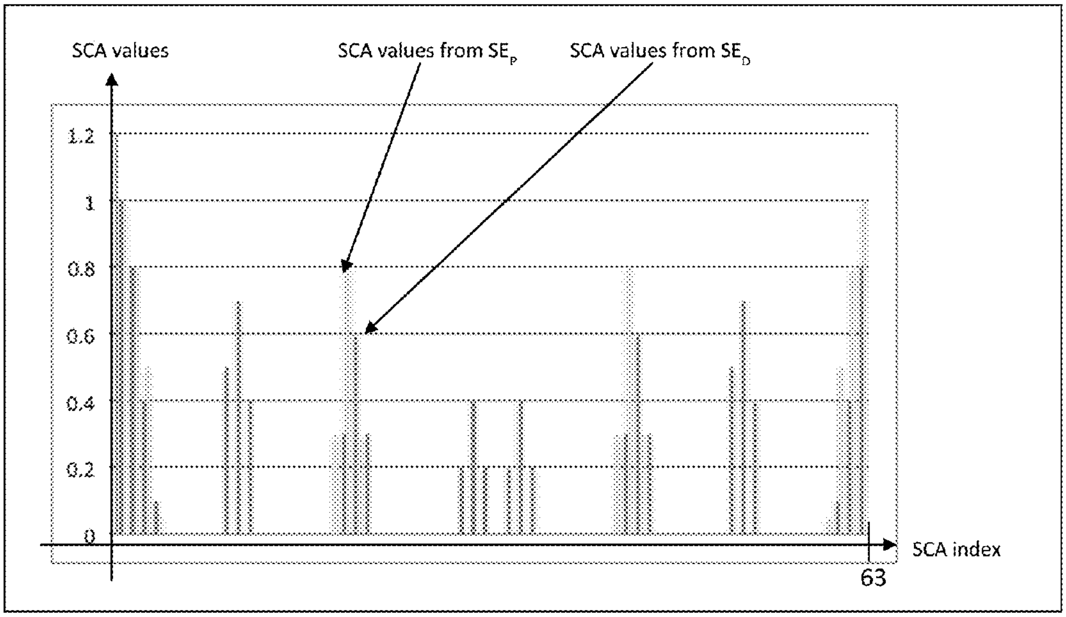
FIG. 14 is graph illustrating Surface Change Autocorrelation values for a perceived sound event and a sound event stored in a database, which relates to determining a distance d3 between the two sound events.

An example of the determination of d3 based on graphs of the SCA values is illustrated in FIG. 14. As shown, each of 64 SCA values for the perceived sound event $SE_P$ are illustrated as a series of bars, and each of the 64 SCA values for a sound event $SE_D$ stored in the database are illustrated as a second series of bars, as shown in a darker shade than the series of bars for the perceived sound event $SE_P$). A Pearson correlation is performed between the two sets of values to express the similarity between the two sets of data. The result of the correlation is a value between 0 and 1 that is stored as d3 in the distance vector.

A fourth distance d4 of the distance vector can be representative of Spectral Evolution Signature Matching. Spectral Evolution Signature Matching is designed to compare the SES values of the perceived sound event $SE_P$, which is the third characteristic described above, to the SSEH values of the sound event $SE_D$ stored in a database, which is the second characteristic described above. In alternative embodiments, the SSEH values of the perceived sound event $SE_P$ can be compared to the SES value of the sound event $SE_D$ stored in a database. The comparison is illustrated by the following equation:

$$d4=\text{Max}[\text{Correlation}(SES_P,SSEH_D(k))],k\in[0,HL-1] \quad (16)$$

where $SES_P$ represents the SES values for the perceived sound event $SE_P$, $SSEH_D(k)$ represents the element number k in the SSEH stack for a sound event $SE_D$ stored in a database, the Correlation refers to the use of a Pearson correlation to determine the relationship between the $SES_P$ and the SES of the $SSEH_D$, and the Max refers to the fact that d4 is the maximum correlation between $SES_P$ and any of the 64 $SSEH_D$ elements stacked in $SSEH_D$ of the perceived sound event $SE_P$.

Figure 15:
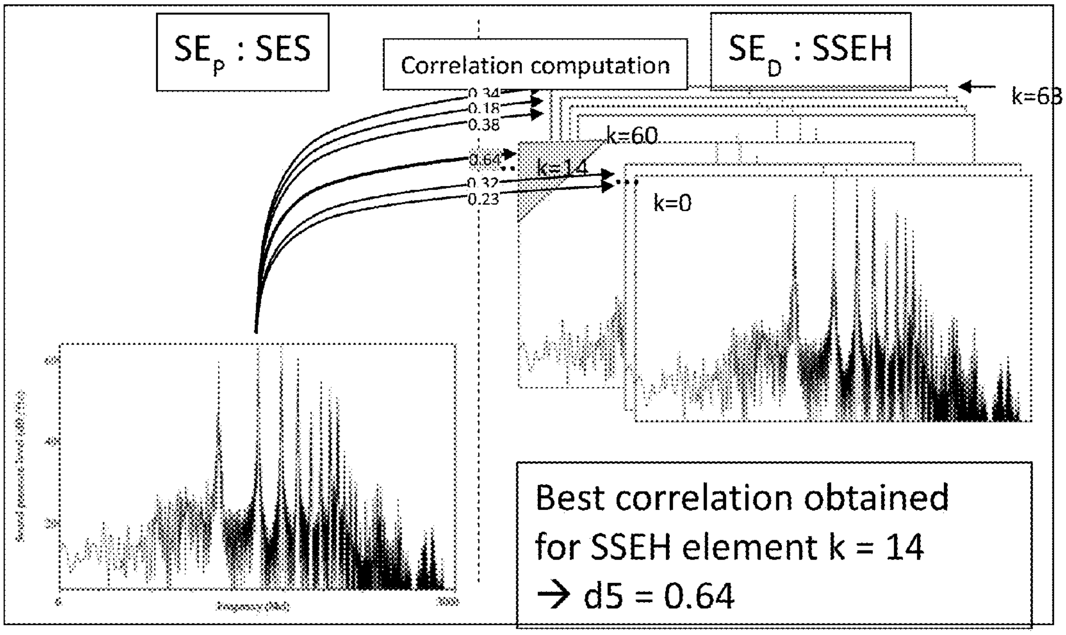
FIG. 15 is a graph illustrating Spectral Evolution Signature values for a perceived sound event and a series of graphs illustrating Soft Spectrum Evolution History values for a sound event stored in a database, which relates to determining a distance d4 between the two sound events.

FIG. 15 provides an illustration of the comparison that occurs, in which the SES values of the perceived sound event $SE_P$ is illustrated as a single graph in a first column, and the SSEH values for each of the 64 spectrums of the stored sound event $SE_D$ are illustrated as a stack in a second column, with each $SSEH_D$ being identified by an indicator k, where k is between 0 and 63. A Pearson correlation is performed between the $SES_P$ and each element of the $SSEH_D$ to express the similarity between them. In the illustrated embodiment, the best correlation is obtained for k=14, in which a correlation equals 0.64. This result, which like all of the other distances in the distance vector, is a value between 0 and 1, and is stored as d4 in the distance vector.

A fifth distance d5 of the distance vector can be representative of a Pulse Number Comparison. The Pulse Number Comparison is designed to compare the number of pulse numbers identified for the perceived sound event $SE_P$ to a number of pulse numbers for a sound event $SE_D$ stored in a database. Based on this comparison, a value for d5 is generated based on the following equations:

$$\text{if } PN_P<PN_D: d5=\text{Min}(PN_P/PN_D,0.4) \quad (17)$$

$$\text{if } PN_P>PN_D: d5=\text{Min}(PN_D/PN_P,0.4) \quad (18)$$

$$\text{if } PN_P=0 \text{ and } PN_D=0: d5=0.5 \quad (19)$$

$$\text{if } PN_P\neq 0, \text{ and } PN_D\neq 0 \text{ and } PN_P=PN_D: d5=0.7 \quad (20)$$

where $PN_P$ is the pulse number for the perceived sound event $SE_P$ and $PN_D$ is the pulse number for a sound event $SE_D$ stored in one or more databases. If the pulse number $PN_P$ is less than the pulse number $PN_D$, then d5 is assigned the value of $PN_P/PN_D$, unless that value is smaller than 0.4, then d5 is assigned the value of 0.4. If the pulse number $PN_P$ is greater than the pulse number $PN_D$, then d5 is assigned the value of $PN_D/PN_P$, unless that value is smaller than 0.4, then d5 is assigned the value of 0.4. If the pulse numbers $PN_P$ and $PN_D$ are both 0, then d5 is assigned the value of 0.5. If $PN_P$ and $PN_D$ are both non null and $PN_P=PN_D$, then d5=0.7. Generally, the value of d5 is used to determine if the two sound events have the same number of pulses, which is a useful determination when trying to identify a source of a sound event, and if the two sound events do not, then the value of d5 is used to monitor a correlations between pulses of the two sound events. These values have been selected in one embodiment as a set giving exemplary results, although a person skilled in the art will recognize that other values can be used in conjunction with this distance without departing from the spirit of the present disclosure. The assigned values can generally be anywhere between 0 and 1. Ultimately, the value is stored as d5 in the distance vector.

A sixth distance d6 of the distance vector can be representative of a location when a location of both the perceived sound event $SE_P$ and a sound event $SE_D$ stored in a database are known. The location can be any or all of a latitude, longitude, and altitude of the location associated with the sound events. For the perceived sound event $SE_P$, it can be a location input by the user, or determined by one or more tools associated with the device receiving the sound event, while for the stored sound event $SE_D$ it can be a location previously saved by the user or otherwise saved to the database. In order to provide some logic in determining how similar the locations are for the two sound events, a step function can be used to graph both sound events, for instance using the following equation:

$$\mathrm{Step}_1(x)=0.4x^3-0.6x^2+0.6 \tag{21}$$

which can keep the value of the step function around approximately 0.5, roughly halfway between the 0 to 1 values used for the distances of the distance vector. A distance, for example a distance in meters, between the location of the perceived sound event $SE_P$, and the location of the stored sound event $SE_D$ can be calculated and entered into the aforementioned step function, as shown in the following equation:

$$d6 = \mathrm{Step}_1\left(\frac{\mathrm{Min}[\mathrm{Max}(S_P, S_D), D_{(P->D)}]}{\mathrm{Max}(S_P, S_D)}\right) \tag{22}$$

where $D_{P->D}$ is the distance between the locations of the two sound events $SE_P$ and $SE_D$, $S_P$ is the estimated radius of existence of event $SE_P$ around its recorded location, as entered by the user when the user created $SE_P$, and $S_D$ is the estimated radius of existence of event $SE_D$ around its recorded location, as entered by the user when she created $SE_D$, with a default value of 1000 if this information has not been entered. In some instances, a distance may be measured in meters, although other forms of measurement are possible. Further, in some instances, a user may want the location to merely determine a location of a city or a city block, while in other instances a user may want the location to determine a more precise location, such as a building or house. The step function provided can impart some logic as to how close the perceived sound event is to the location saved for a sound event in the database, and the distance between those two sound events, which has a value between 0 and 1, can be stored as d6 in the distance vector. A distance closer to 1 indicates a shorter distance while a distance closer to 0 indicates a longer distance.

A seventh distance d7 of the distance vector can be representative of a time a sound event occurs, comparing a time of the perceived sound event $SE_P$ and a time associated with a sound event $SE_D$ stored in a database. The time can be a particular hour of the day associated with the sound events. For the perceived sound event $SE_P$, the time at which the sound occurred can be automatically detected by the system, and a user can set a range of times for which that sound event should be associated if it is to be stored in a database. For the stored sound events $SE_D$, each event can have a range of times associated with it as times of day that particular sound event is likely to occur, e.g., for instance between 4 AM and 7 AM for an alarm clock. A time, for example in hours based on a 24-hour mode, between the time of the perceived sound event $SE_P$, and the time of the stored sound event $SE_D$ can be calculated and entered into the aforementioned step function (equation 21), as shown in the following equation:

$$d7 = \mathrm{Step}_1\left(\frac{\mathrm{span}(T_P, T_D)}{12}\right) \tag{23}$$

where $T_P$ is the hour of the day of the perceived sound event, $T_D$ is the hour of the day of the sound event stored in a database, and $\mathrm{span}(T_P,T_D)$ is the smallest time span between those two events that can be expressed, in hours. For example, $T_P$ can be 9 AM; and $T_D$ equaling 10 AM would then raise a $\mathrm{span}(T_P,T_D)$=1 hour, and $T_D$ equaling 8 AM would also raise a span $(T_P,T_D)$=1 hour. The step function provided can impart some logic as to how close in time the perceived sound event $SE_P$ is to the time associated with a particular sound event $SE_D$ stored in the database, and the distance between those two sound events, which has a value between 0 and 1, can be stored as d7 in the distance vector. A distance closer to 1 indicates a smaller time disparity while a distance closer to 0 indicates a larger time disparity. If the user entered a specific interval of the day where $SE_D$ can occur, d7 is set To 0.7 in that interval, and to 0 out of that interval.

An eighth distance d8 of the distance vector can be representative of a day a sound event occurs, such as a day of the week. While this vector can be set-up in a variety of manners, in one embodiment it assigns a value to d8 of 0.6 when the day of the week of the perceived sound event $SE_P$ is the same day as the day of the week associated with a sound event $SE_D$ stored in a database to which the perceived sound event is compared, and a value of 0.4 when the day of the week between the two sound events $SE_P$ and $SE_D$ do not match. In other instances, a particular day(s) of the month or even the year can be used as the identifier rather than a day(s) of the week or year. For example, a stored sound event may be a tornado siren having a day of the week associated with it as the first Saturday of a month, which can often be a signal test in some areas of the country depending on the time of day. Alternatively, a stored sound event may be fireworks having a day of the week associated with it as the time period between Jul. 1-8, which can be a time period in the United States during which the use of fireworks may be more prevalent because of the Fourth of July. The use of the values of 0.6 to indicate a match and 0.4 to indicate no match can be altered as desired to provide greater or lesser importance to this distance vector. The closer the match value is to 1, the more important that distance may become in the distance vector determination. Likewise, the closer the no match value is to 0, to the more important that distance may become in the distance vector determination. By keeping the matches closer to 0.5, the values have an impact, but not an overstated impact, in the distance vector determination.

A ninth distance d9 of the distance vector can be representative of a position of the system perceiving the sound event, which is different than a location, as described above with respect to the distance d7. The position can be based on 3 components [x, y, and z] of a reference vector R with $|R|=1$. The position can be helpful in helping to determine the orientation of the system when the sound event occurs. This can be helpful, for example, in determining that the system is in a user's pocked when certain sound events are perceived, or is resting flat when other sound events are perceived. The position vector for a smart phone for example can be set to be orthogonal to the screen and oriented toward the user when the user is facing the screen.

A position between the position of the system when the perceived sound event $SE_P$ was perceived and the position of the system stored in conjunction with a sound event $SE_D$ stored in a database can be calculated and entered into the aforementioned step function (equation 21), as shown in the following equation:

$$d9=\mathrm{Step}_1(\mathrm{Min}(R_D \cdot R_P,0)) \quad (24)$$

where $R_P$ is the position of the perceived sound event $SE_P$, $R_D$ is the position of the sound event $SE_D$ stored in a database, and the "·" indicates a scalar product is determined between $R_P$ and $R_D$ to determine if the orientation of the two vectors are aligned. The scalar product between two vectors raises a value equals to the cosine of their angle. The expression $\mathrm{Min}(R_D \cdot R_P, 0)$ therefore raises a value which is 1 if the vectors have the same orientation, decreasing to 0 if they are orthogonal and remaining 0 if their angle is more than $\pi/2$. A difference between the positions can be based on whatever coordinates are used to define the positions of the respective sound events $SE_P$ and $SE_D$. The position measured can be as precise as desired by a user. The step function provided can impart some logic as to how close the perceived position is to the position saved for a sound event in the database, and the distance between those two sound events, which has a value between 0 and 1, can be stored as d9 in the distance vector. A distance closer to 1 indicates a position more aligned with the position of the stored sound event, while a distance closer to 0 indicates a distance less aligned with the position associated with the stored sound event.

A tenth distance d10 of the distance vector can be representative of the acceleration of the system perceiving the sound event. Acceleration can be represented by a tridimensional vector A [Ax, Ay, Az]. In one exemplary embodiment, the distance vector associated with acceleration is intended to only determine if the system perceiving the sound event is moving or not moving. Accordingly, in one exemplary embodiment, if the tridimensional vector of the perceived sound event $A_P$ and the tridimensional vector of the sound event stored in a database $A_D$ are both 0, then d6 can be set to 0.6, whereas if either or both are not 0, then d10 can be set to 0.4. In other embodiments, more particular information the acceleration, including how much acceleration is occurring or in what direction the acceleration is occurring, can be factored into the determination of the tenth distance d10.

An eleventh distance d11 of the distance vector can be representative of an amount of light surrounding the system perceiving the sound event. The system can include a light sensor capable of measuring an amount of ambient light L. This can help discern sound events that are more likely to be heard in a dark room or at night as compared to sound events that are more likely to be heard in a well lit room or outside during daylight hours. A scale for the amount of ambient light can be set such that 0 represents complete darkness and 1 represents a full saturation of light. A comparison of the light associated with the perceived sound event $SE_P$ and a sound event $SE_D$ stored in a database can be associated with the aforementioned step function (equation 21) as shown in the following equation:

$$d11=\mathrm{Step}_1(|L_P-L_D|) \quad (25)$$

where $L_P$ is the amount of light associated with the perceived sound event and $L_D$ is the amount of light associated with the sound event stored in a database. The step function provided can impart some logic as to how similar the amount of light surrounding the system is at the time the perceived sound event $SE_P$ is observed in comparison the amount of light surrounding a system for a sound event $SE_D$ stored in the database. A value closer to 1 indicates a similar amount of light associated with the two sound events, while a value closer to 0 indicates a disparate amount of light associated with the two sound events.

A twelfth distance d12 of the distance vector can be a calculation of the average value of the distance vectors d1 through d11. This value can be used as a single source identifier for a particular sound event, or as another dimension of the distance vector as provided above in equation 11. In some instances, the single value associated with d12 can be used to make an initial determination about whether the sound event should be included as part of a Sound Vector Machine, as described in greater detail below. The average of the distance vectors d1 through d11 is illustrated by the following equation:

$$d12 = \sum_{k=1}^{k=11} \frac{d_k}{11} \quad (26)$$

where d represents the distance vector and k represents the number associated with each distance vector, so 1 through 11. The resulting value for d12 is between 0 and 1 because each of d1 through d11 also has a value between 0 and 1.

Optimization Aspect of the Learning Layer

In addition to measuring the distances associated with the distance vector, the learning layer is also designed to optimize a decision making process about whether a perceived sound event is the same or different from a sound event stored in a database, sometimes referred to as a Similarity Decision. This aspect of the learning layer can also be referred to as an adaptive learning module. There are many ways by which the learning layer performs the aforementioned optimizations, at least some of which are provided for herein. These ways include, but are not limited to, making an initial analysis based on a select number of parameters, characteristics, or distances from a distance vector, including just one value, about whether there is no likelihood of a match, some likelihood of a match, or even a direct match, and/or making a determination about which parameters, characteristics, or distances from a distance vector are the most telling in making match determinations.

For example, in one exemplary embodiment, when a sound event is perceived ($SE_P$), the role of the learning layer for that sound event can be to decide if the distance between itself and a sound event stored in a database ($SE_D$) should trigger a positive result, in which the system recognizes that $SE_P$ and $SE_D$ are the same sound event, or a negative result, in which the system recognizes that $SE_P$ and $SE_D$ are different sound events. The layer is designed to progressively improve the efficiency of its decision.

As described above, each sound event has specific characteristics, and each characteristic has an importance in the identification process that is specific for each different sound, e.g., the determination of a distance between two sound events. When a distance is computed, if all the components of the distance vector are equal to zero, the decision is positive, whatever the event. For example, when the sound event is a telephone ringing, the importance of melody, for which distances in distance vectors tied to an MRH are most related, may be dominant, but for knocks at the door the SCA may be more important than melody. So each event has to get a customized decision process so that the system knows which characteristics and distances of the distance vector are most telling for each sound event.

The ability of the system to discern a learning layer from a sound event triggers several important properties of the system. First, adding or removing an event does not require that the whole system be re-trained. Each event takes decisions independently, and the decisions are aggregated over time. In existing sound detection applications, changing the number of output implies a complete re-training of the machine learning system, which would be computationally extremely expensive. Further, the present system allows for several events to be identified simultaneously. If a second sound event $SE_{P2}$ is perceived at the same time the first sound event $SE_P$ is perceived, both $SE_{P2}$ and $SE_P$ can be compared to each other and/or to stored sound event $SE_D$ to make determinations about their similarities, thereby excluding the risk that one event masks the other.

In one exemplary embodiment, the learning layer 560 can include data, a model, and a modelizer. Data for the learning layer 560 is an exhaustive collection of a user's interaction with the decision process. This data can be stored in three lists of Distance Vectors and one list of Booleans. The first list can be a "True Positives List." The True Positives List is a list that includes sound events for which a positive decision was made and the user confirms the positive decision. In such instances, the distance vector D that led to this decision is stored in the True Positive List. The second list can be a "False Positives List." The False Positives List is a list of sound events for which a positive decision was made but the user contradicted the decision, thus indicating the particular sound event did not happen. In such instances, the distance vector D that led to this decision is stored in the False Positives List. The third list can be a "False Negatives List." The False Negatives List is a list that includes sound events for which a negative decision was made but the user contradicted the decision, thus indicating that the same event occurred again. Because the event was missed, the distance vector for that event is missed. Thus, the false negative feedback is meta-information that activates a meta-response. The false negative is just to learn. It is not plotted in a chart like the other two, as discussed below and shown in FIG. 16.

Figure 16:
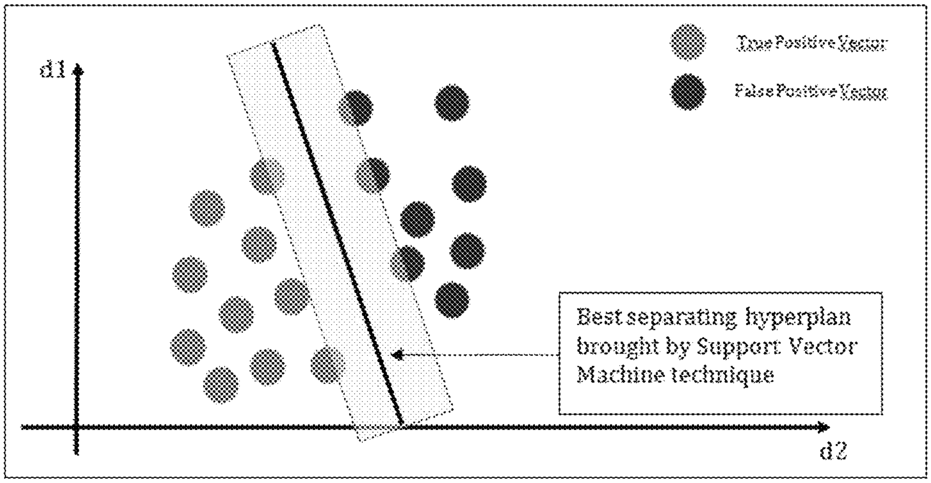
FIG. 16 is a graph illustrating interactive user data created by users confirming whether an identified sound event was correctly identified.

The data identified as True Positive Vectors (TPV) and False Positive Vectors (FPV) can then be plotted on a chart in which a first sound identification feature, as shown the distance d1 of the distance vector, forms the X-axis and a second sound identification feature, as shown the distance d2 of the distance vector, forms the Y-axis. The plotting of the distance vectors can be referred to as a profile for that particular sound event. Notably, although the graph in FIG. 16 is 2-dimensional and illustrates a comparison between d1 and d2, in practice the comparison of the distance vectors for the perceived sound event $SE_P$ and a sound event $SE_D$ from a database can occur across any number of dimensions, including the entirety of the distance vector d. Accordingly, in the embodiment of the distance vector described above in which N=12, the comparison can be done 12-dimensionally. The use of the 2-dimensional graph is done primarily for illustrative purposes and basic understanding of the process.

The data described above create 2 varieties of points in an N-dimensional space, True Positive Vector (TPV) and False Positive Vector (FPV). The illustrated model is an (N−1)-dimension frontier between these two categories, creating two distinct areas in the N-dimension Distance space. This allows a new vector to be classified that corresponds to a new distance computed between the first sound event and the second sound event. If this vector is in the TPV area a positive decision is triggered.

An algorithm can then be performed to identify the (N−1)-dimension the hyper-plane that best separates the TPVs from the FPVs in an N-dimension space. In other words, the derived hyper-plane maximizes the margin around the separating hyper-plane. In one exemplary embodiment, a software library known as Lib-SVM—A Library for Support Vector Machines, which is authored by Chih-Chung Chang and Chih-Jen Lin and is available at http://www.csie.ntu.edu.tw/~cjlin/libscm, can be used to derive the hyper-plane. ACM Transactions on Intelligent Systems and Technology, 2:227:11-27:27, 2011. As new data is received, the hyper-plane, and thus the profile of the sound event, can be self-adjusting.

Initialization and Learning Process

When a new sound event is stored in one or more databases as an event that can be searched when future incoming signals are received, an initialization and learning process starts. There is not yet any history of a user's feedback regarding this new sound event $SE_{DN}$ (i.e., the TPV and FPV lists are empty), and thus a similarity decision between $SE_{DN}$ and a perceived sound event $SE_P$ cannot be driven by a Support Vector Machine, as used when there is enough data in TPV and FPV. As the distance between $SE_D$ and $SE_P$ is a 12-dimension vector in the main described embodiment, it can be represented as a point in a 12-dimension space. Therefore, taking a Similarity Decision is analogous to determining two regions in that space. A first region close to the origin, in which the smaller the distance, the higher the similarity, and a second region where the distance is too important to raise a positive decision. The optimization problem is then to find the best frontier between those two regions, the best frontier meaning the frontier best separating TPV and FPV, with a maximal distance to the TPV vectors on one side and the FPV vectors on the other side closest to it. Those closest vectors are called "Support Vectors." An efficient method to determine the best separating hyper-plane has been described under the appellation of a "Support Vector Machine" (SVM). SVM is a non-probabilistic binary linear classifier. The original SVM algorithm was created by Vladimir N. Vapnik and Alexey Ya. Chervonenkis in 1963. Turning back to receiving a sound event for which there is no history, because there is no history, during this initial phase the decision can be made considering only the last value of the distance vector, d12. If d12 is greater than a given threshold, $d12_T$, a positive decision is triggered. In one exemplary embodiment, $d12_T$ can be set to 0.6, although other values are certainly possible.

At each positive decision in which a sound event is linked to a stored sound event, the user is asked for feedback. The user can confirm or reject the machine's decision. The user can also notify the machine when the event happened and no positive decision has been made. When the learning layer has at least a $TPVN_{min}$ true positive and a $FPV_{min}$ false positive feedback collected, the decision process can switch to the modeling system, as described above with respect to FIG. 16. In one exemplary embodiment, $TPVN_{min}$=5 true positive and $FPV_{min}$=3 false positive are acquired before switching to the modeling system for all future sound events of a similar nature. In some embodiments, if $FPV_{min}$=3 false positives are unable to be achieved, the net result can be that no learning layer is needed because the identification is so accurate.

Identification and Optimization Process $N_{Events}$ for a sound event are stored in one or more databases associated with the device, and each sound event is intended to be identified if a similar event is present in the incoming signal. In one exemplary embodiment, the identification process follows the steps outlined below. These steps are intended to help optimize the decision making process.

In a first step, a Strong Context Filter (SCF) goes periodically through all stored sound events ($SE_i$) and labels each as "Active" or "Inactive." While the period for which the SCF is run can vary, in one exemplary embodiment the default value ($SCF_{Period}$) is one minute.

In a second step, a Scan Process (SP) periodically extracts or otherwise derives the characteristics that make-up the sound event ($SE_P$) from the incoming audio signal and then goes through the list of active sound events ($SE_i$) to try and find a match in the one or more databases. This step can be run in parallel with first step for other incoming sounds. While the period for which the SP is run can vary, in one exemplary embodiment the default value ($SP_{Period}$) is one second.

For each active sound event ($SE_i$) that is stored in one or more databases associated with the device, it includes a Primary Decision Module (PDM) that compares the incoming sound event ($SE_P$) with each of the active sound events ($SE_i$) and makes a first decision regarding the relevance of further computation. The purpose is to make a simple, fast decision to determine if any of the distances should even be calculated. For example, it may analyze wavelength of sound to determine accuracy, such as whether the wavelength is under 100 Hz, and thus it can determine that the incoming sound is not a door bell. The PDM is generally intended to be fast and adaptive.

If the PDM accepts further computation, signaling that the presence of the event stored in the one or more databases ($SE_i$) is a possibility, the distance $\delta(SE_P, SE_D)$ can then be computed and can lead to a decision through the rule-based then data-based decision layers of the incoming sound event ($SE_P$) as described above, i.e., the sound information layer, the multimodal layer, and the calculation of distances aspect of the learning layer. If there is no match, then an inferential analysis can be performed.

The Strong Context Filter (SCF) reduces the risk of false positives, increases the number of total events the system can handle simultaneously, and reduces the battery consumption by avoiding irrelevant computation. The SCF is linked to information the user inputs when recording a new sound and creating the related sound event. The user is invited, for example, to record if the sound event is location-dependent, time-dependent, etc. If the event is presented as location-dependent, the software proposes a series of possible ranges, for example a person's house, office building, car, grocery store, etc. Locations can be even more specific, based on particular GPS coordinates, or more general, such a person's country. If the event is presented as time-dependent, the software allows a user to input a time range during which this event can happen. Beyond time and location, some other information can be added to the sound event and filtered by the SCF include movement, light, and position in space. Using SCF, a given sound event can be activated, for example, only at night, positioned vertically, not moving, and in a given area. That could correspond to a phone left in the car in its usual car park, where the car alarm would be the sound feature of the corresponding sound event.

Further, beyond the user providing information about important characteristics of a sound event, based on the information associated with the sound events, the system can begin to learn which characteristics have a greater bearing on whether a perceived sound event is a particular type of sound event stored in the one or more databases. For example, the Primary Decision Module (PDM) is provided to allow for more efficient analysis. Every SP period, such as the default value of 1 second as discussed above, a new sound event $SE_P$ is scanned for by the mobile device. The event is broken down into chunks and analyzed as described herein, and then compared to all active stored sound events. If a given sound event, $SE_D$, is tagged as active by the SCF, the comparison between $SE_P$ and $SE_D$ begins with a decision from the PDM. The role of this module is to avoid further computation if $SE_P$ and $SE_D$ are too different.

A positive decision from PDM arises if a series of conditions are true. These conditions are examined consecutively, and any false condition triggers immediately a negative decision of the PDM. In one exemplary embodiment, the conditions are as follows:

$$\text{1. Minimal power: } SSCH_P \neq 0 \tag{27}$$

$$\text{2. Surface Change Autocorrelation: } |SCA_P - SCA_D| < 0.5 \tag{28}$$

$$\text{3. If } SCA_P > 0.5 \text{ and } SCA_D > 0.5; \tag{29}$$

$$\text{Rhythm: } \left(\frac{\Delta P}{\Delta D}\right) \text{ or } \left(\frac{\Delta D}{\Delta P}\right) \in [0.9; 1.1] \cup [1.8; 2.2] \cup [2.7; 3.3]$$

which means that no further computation is performed if the incoming signal is null, or if the two signals have very different autocorrelation values, or if, in the case they have an SCA value that suggests the existence of a rhythm, if these rhythms are too different. Provided each of these conditions is met, then analysis continues. If one is not true, the sound events are too different and either another sound event from the database is compared or the sound event is recorded as a new sound event.

In instances where the analysis is to continue, the distance $\delta(SE_P, SE_D)$ between the stored event $SE_D$ and the incoming or perceived event $SE_P$ is computed, as described above with respect to the N-dimension vector $$D = \begin{bmatrix} d1 \\ d2 \\ \ldots \\ dN \end{bmatrix}.$$

Figure 17:
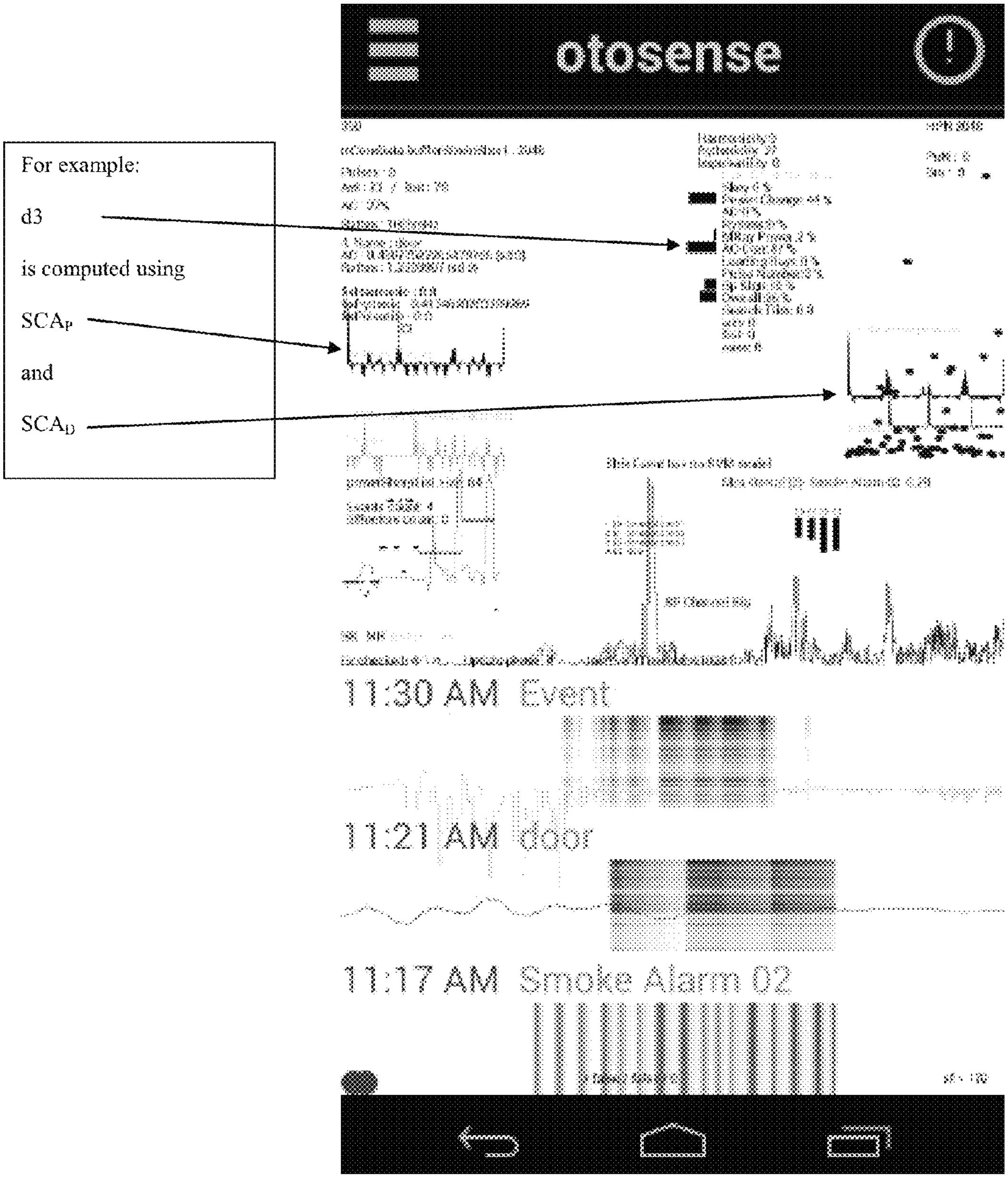
FIG. 17 is a screen capture of a display screen illustrating various characteristics and/or distances of at least one sound event.
Figure 18:
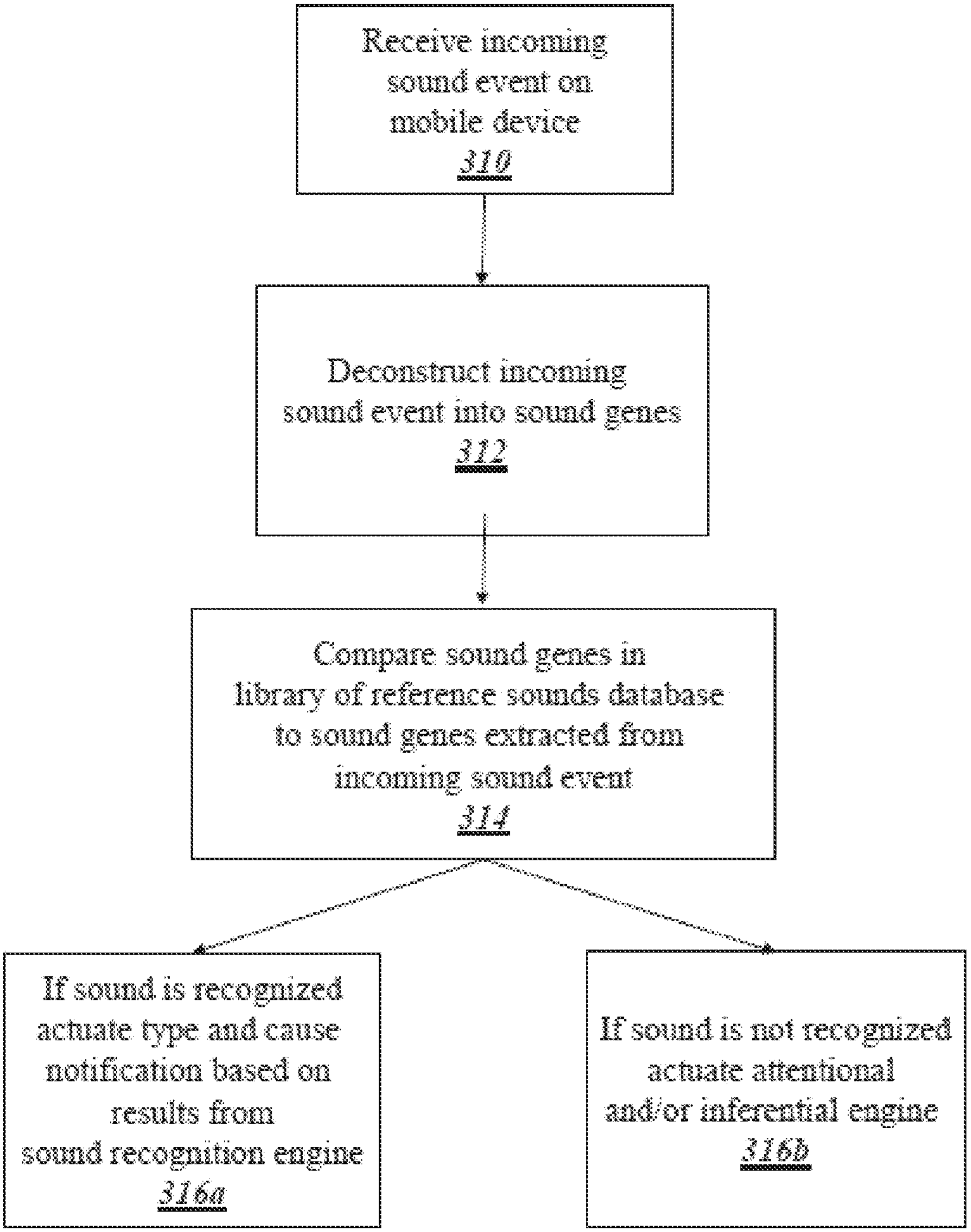
FIG. 18 is a schematic illustration of one exemplary embodiment of a process for receiving and identifying a sound event.

As the computations are being made, one or more of the characteristics and/or distances can be displayed on a display screen. FIG. 17 provides one exemplary embodiment of such a display screen. For example, as shown, the d3 distance of the distance vector is illustrated near the top right hand corner of the screen, which itself is computer using two characteristics also displayed on the display screen: SCAP, shown near the top left hand corner of the screen, and SCAD, shown underneath the d3 computation. A person skilled in the art will recognize other characteristics and distances can be displayed on a display screen, as can other information, some examples of which are discussed below and/or are shown in FIG. 17, such as the event identifications of a "door" and a "smoke alarm."

Inferential Engine

When a sound event is a new sound event, other measures can be performed to try to determine the source of that sound event. In one exemplary embodiment, an inferential engine is used to make determinations. Such an engine needs many parameters, from the capture of audio signal to variables computation, to distance computation, to a Support Vector Machine, which is described in greater detail below. In one exemplary embodiment, the software includes about 115 parameters, which are partially interdependent, and which have a huge impact on the inferential engine's behavior. Finding the optimal parameters set is a complex optimization problem. In one embodiment, an Ecologic Parallel Genetic Algorithm can be used.

Method for Identifying Incoming Sound Event

FIGS. 18-21 depict an embodiment of a method for identifying a plurality of incoming sound events 190 according to aspects of the present invention. In one embodiment, the sound source identification system 110 receives 310 an incoming sound event 190 and decomposes the incoming sound event 190 into a plurality of audio chunks, and from those chunks, and/or from contextual information related to the source of the sound event, determines one or more characteristics or features of the sound event. The characteristics can then be used to formulate one or more sound genes 312. The sound gene 312 can be the distance vector, or one or more of the distances associated with the distance vector. In some more basic embodiments, the sound gene may simply comprise the characteristic or feature information. One of skill in the art will appreciate that an incoming sound event 190 can be decomposed into a plurality of audio chunks, characteristics, and/or sound genes associated with the incoming sound event, as described herein, as derivable from the present disclosure, or otherwise known to those skilled in the art. Sound genes can form the basis of composite variables that can be organized into a fuzzy set that can represent features of the incoming sound event 190, i.e., the distances of the distance vector. For example, harmonicity 532 can be composed of a mix of genes. The mix can include a sound gene represented by any of the characteristics or related information (e.g., distances d1-d12 associated with the distance vector d) provided for herein or otherwise identifiable for a sound event, including but not limited to a high spectral peaks number, a sound gene represented by a harmonic suites ratio, and a sound gene represented by a signal to noise ratio.

Sound source identification software application 123 executing on a microprocessor 122 in the mobile device 130 can drive a search within the library of reference sounds 121 to identify, for example, a match to an incoming sound event 190 by comparing sets of sound genes associated with the incoming sound event 190 with sets of sound genes associated with reference sound events in the library of reference sounds 121. The sound recognition engine can search for a match between incoming sound and contextually validated known sound events that can be stored in the library of reference sounds 121, a described in greater detail above. The sound source identification software application 123 can then assign to the incoming sound event 190 an origin based on recognition of the incoming sound event 190 in the library of reference sounds.

In accordance with one embodiment of the sound source identification system 110 according to aspects of the present invention, if an incoming sound event 190 is not recognized 316*b*, the incoming sound event 190 can be analyzed to ascertain whether or not it is of significance to the user, and, if so, can be analyzed by the inferential adaptive learning process to give a user a first set of information about the characteristics of the sound and make a first categorization between a plurality of sound categories. Sound categories can include but are not limited to music, voices, machines, knocks, or explosions. As an illustrative example, an incoming sound event 190 can be categorized as musical if, for example, features such as rhythmicity can be identified at or above a predetermined threshold level in the incoming sound event 190. Other sound features can include but are not limited to loudness, pitch, and brutality, as well as any of the characteristics described herein, related thereto, or otherwise able to be discerned from a sound event.

The predetermined threshold can be dynamic and can be dependent upon feedback input by the user via the interactive user interface 140. The interactive user interface 140 communicates with the user, for example by displaying icons indicating the significance of a set of features in the incoming sound event 190. The interactive user interface 140 can display a proposed classification for the incoming sound event 190. In one embodiment of the present invention, these features can be sent to the central intelligence unit 170 if there is a network connection. The central intelligence unit 170 (for example, a distal server) can make a higher-level sound categorization but is not limited to executing Bayesian classifiers. The user can receive from the central intelligence unit 170 notification of a probable sound source and an associated probability, through text and icons. The inferential engine can iterate further to identify more specifically the source of the incoming sound.

According to aspects of an embodiment of the present invention, if the sound characteristics or genes associated with sounds in the library of reference sounds 121 and the accessible remote database 171 cannot be matched sufficiently well to the sound characteristics or genes associated with an incoming sound event 190, and the incoming sound event 190 cannot be recognized, the sound source identification system 110 can classify the type of sound and display information about the type, if not the origin, of the incoming sound event 190. An interactive user interface 140 can guide the user through a process for integrating new sounds (and associated sound characteristics and genes) into the library of reference sounds 121 and remote database 171 (when accessible). The library of reference sounds 121 and remote database 171 can incorporate new sounds a user considers important.

Figure 19:
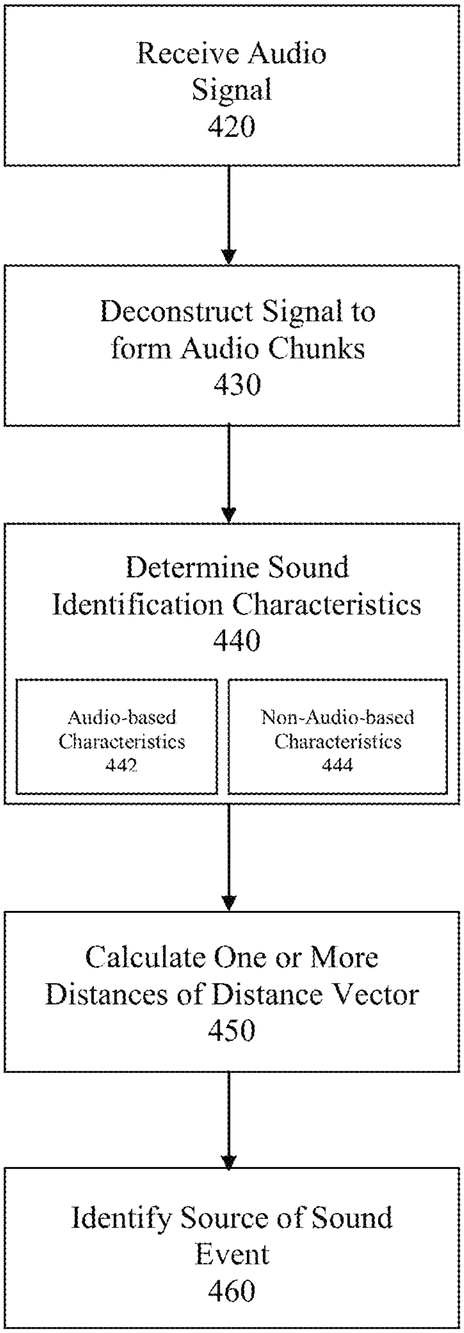
FIG. 19 is a schematic illustration of one exemplary embodiment of how a sound event is identified based primarily on a sound information layer.

The block diagram in FIG. 19 illustrates an embodiment of the process by which data from an audio signal forms the basis of the sound information layer 520. The audio signal from a sound event is received 420 by a device or system, and is broken down into audio chunks 430 by a processor or the like of the system, as described above. From those audio chunks, various sound identification characteristics or features can be determined 440, including audio-based characteristics 442 (e.g., SSCH, SSEH, SES, MRH, HPN, SCA, Rhythm, BRH Set, and PN) and non-audio based characteristics 444 (e.g., location, time, day, position of the device receiving the audio signal of the sound event, the acceleration of the device receiving the audio signal of the sound event, and a light intensity surrounding the device receiving the audio signal of the sound event). One or more of these characteristics can then be used to derive or calculate one or more distances to be included in the distance vector 450, which define one or more sound genes for the sound event. One or more of the sound genes can be used to identify the source of a sound event 460, for instance by comparing one or more of the sound genes of the incoming sound event to commensurate sound genes of sound events stored in one or more databases associated with the system. In some instance, the characteristics themselves can be the sound gene and/or can be used to identify the sound event by comparing the characteristics of an incoming sound event to commensurate characteristics of one or more sound events stored in one or more databases associated with the system.

Figure 20:
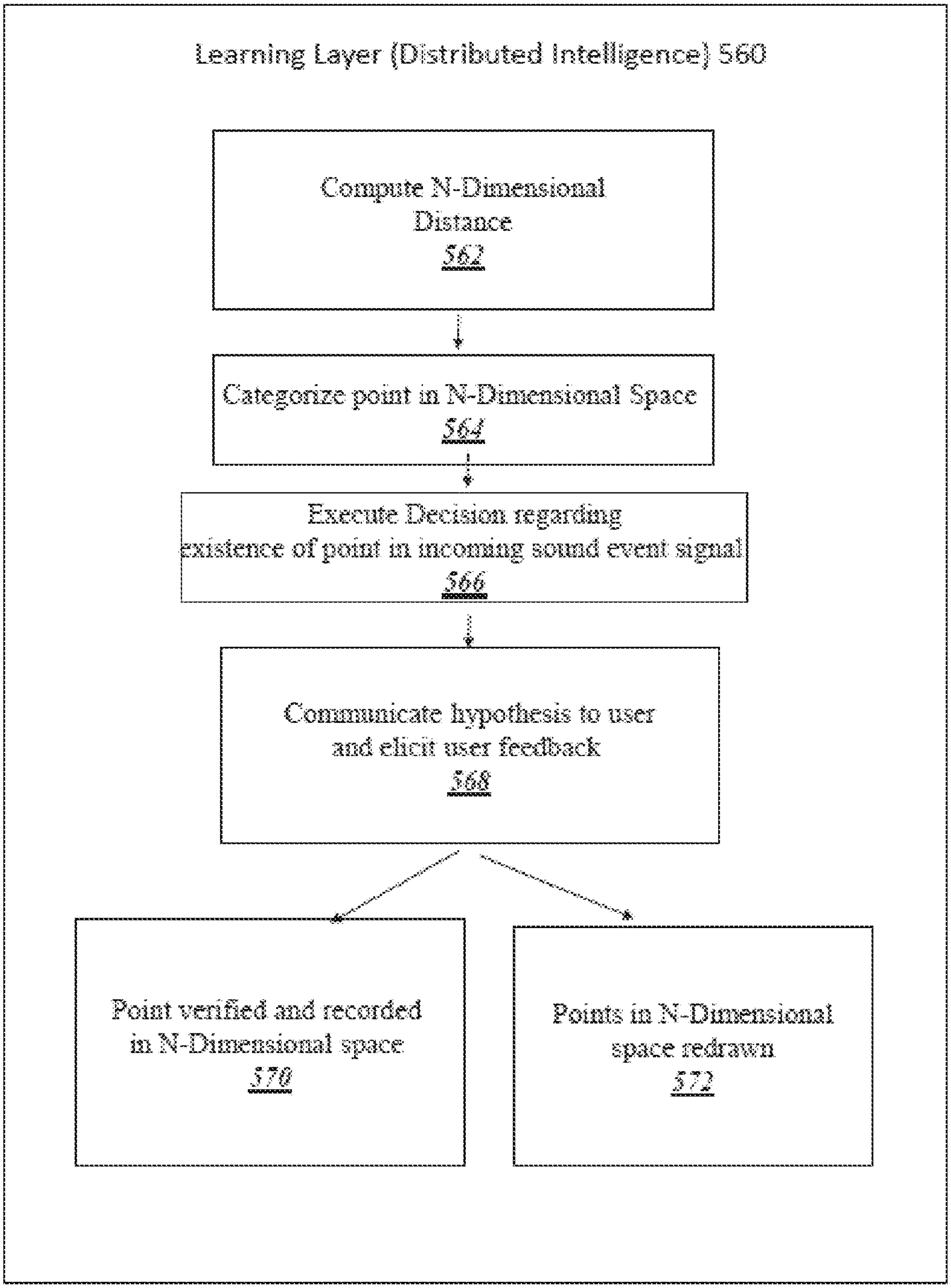
FIG. 20 is a schematic illustration of how information about a sound event is defined for a learning layer of the sound event.

The method, according to one aspect of the invention, is adaptive and can learn the specific sounds of everyday life of a user, as illustrated in FIGS. 18-21 according to aspects of the present invention. FIG. 20 illustrates an embodiment of the third layer of a sound event, the learning layer 560. According to aspects of an embodiment of the present invention, the reference sound event and/or the incoming sound event can pass through the learning layer, as described in greater detail above. The steps performed as part of the learning layer can include first performing one or more filter steps to help eliminate the need to make too many comparisons between the sound gene, or sound characteristic, of the incoming sound event and one or more of the sound events stored in one or more databases associated with the system. The filtering process is not required, but is helpful in conserving computing power and in improving the accuracy and speed of the sound identification process. The sound gene, or sound characteristics, of the incoming sound event can subsequently be compared to commensurate sound gene information, as well as commensurate sound characteristics, of one or more sound events stored in the one or more databases. As identifications are made, users can then be asked to provide input about the accuracy of the result, which helps to shape future identifications of sound events, as also described above. The system can make adjustments to a stored sound gene or characteristic based on the user input. It can be a hybrid process.

The learning layer 560 can engage the interactive user interface 140 and can prompt the user and/or utilize user feedback regarding an incoming sound event 190. According to aspects of an embodiment of the present invention, the learning layer can incorporate feedback from the user to modify parameters of the sound event that are used to calculate a multidimensional distance, for instance as described above with respect to FIG. 16. The learning layer can utilize the user feedback to optimize the way in which data is weighted during analysis 564 and the way in which data is searched 566. The learning layer can utilize user feedback to adjust the set of sound characteristics and/or genes associated with the incoming sound event 190.

Figure 21:
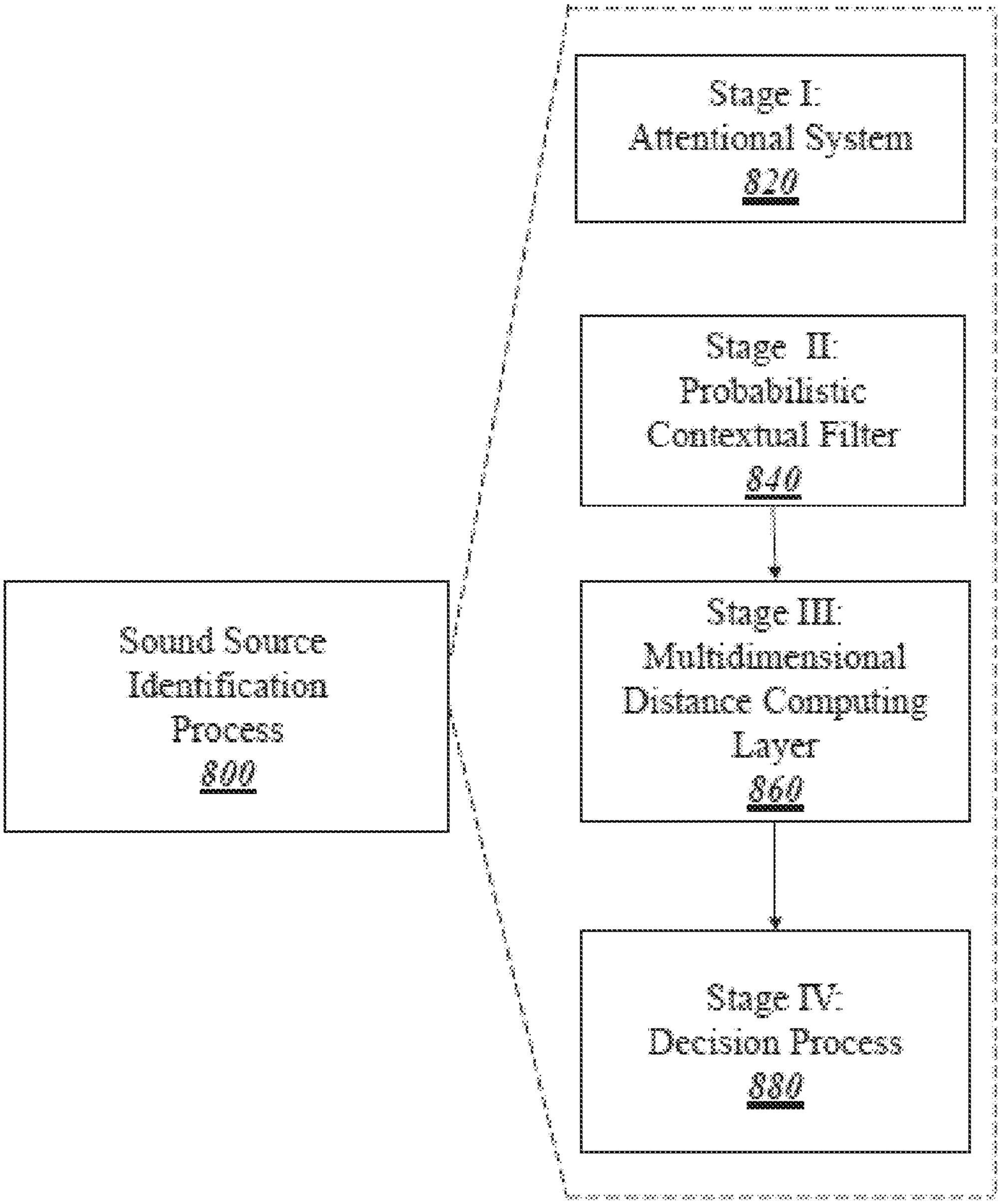
FIG. 21 is a schematic illustration of one exemplary embodiment of a sound source identification process.
Figure 22:
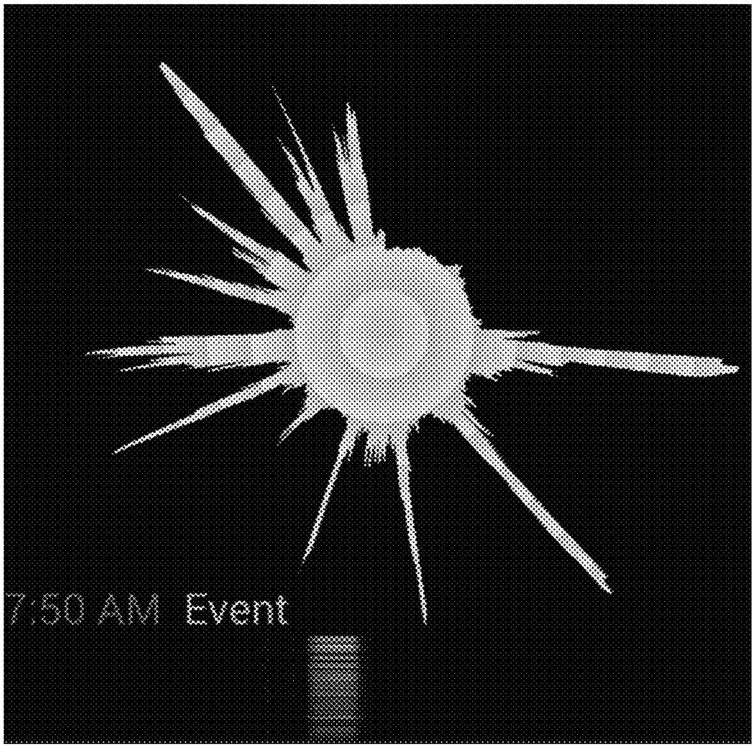
FIG. 22 is a screen capture of a display screen illustrating one exemplary embodiment of a visual representation of an incoming sound event at one point in time.

Data can be received, processed and analyzed in real time. By "real time" what is meant is a time span of between about 0.5 seconds and 3.0 seconds for receiving, processing, analyzing, and instructing a desired action (e.g., vibrate, flash, display, alert, send a message, trigger the vibration of another device, trigger an action on a smart watch connected to the device, make a push notification on another device). FIG. 21 is a schematic block diagram illustrating one exemplary embodiment of a method for interpreting and determining the source of incoming sound events using real time analysis of an unknown sound event. In accordance with an example embodiment, the sound source identification process 800 can be classified into four stages.

In the first phase 820, the incoming sound event 190 is processed to determine whether or not the incoming sound event 190 is above a set lower threshold of interest to the user. The incoming sound event 190 is classified as being in one of at least two categories, the first category being a first degree incoming sound event 190, the second category being a second degree incoming sound event 190. An incoming sound event 190 can be categorized as a first degree event if the spectrum global derivative with respect to time is under a predetermined threshold, for example d12 is greater than a given threshold $d12_T$=0.6. For a first degree event, no further computation is performed and no search is initiated for a reference sound event and no action is triggered to alert a user of an incoming sound event 190 of interest and/or an incoming sound event 190 requiring attention.

If an incoming sound event 190 is considered worthy of attention, it can be processed and its features or characteristics can be extracted. From these features a first local classification can be made, for instance using one or more of the distances of a distance vector as discussed above, and can lead to providing the user with a set of icons and a description of the type of sound and its probable category. This can be sent to the server if there is a network connection. The server can constantly organize its data to categorize the data with mainly Bayesian processes. The server can propose a more accurate classification of the incoming sound and can communicate to the user a most probable sound source, with an associated probability. This information is then given to the user through text and icons.

An incoming sound event 190 is categorized as a second degree event if the spectrum global derivative with respect to time is at or over the set lower threshold of interest. An incoming sound event 190 can be categorized as a second degree event if a change in the user's environment is of a magnitude to arouse the attention of a hearing person or animal. An illustrative example is an audible sound event that would arouse the attention of a person or animal without hearing loss. Examples can include but are not limited to a strong pulse, a rapid change in harmonicity, or a loud sound.

For a second degree event, an action is triggered by the sound source identification system 110. In an embodiment, an action can be directing data to a sound recognition process engine 316*a*. In an embodiment an action can be directing data to a sound inferential identification engine 316*b*. In another embodiment, an action can be activating a visual representation of a sound on the interactive user interface 140 screen 180 of a mobile device 130. One skilled in the art will recognize that an action can be one of a plurality of possible process steps and/or a plurality of external manifestations of a process step in accordance with aspects of the present invention.

In a second stage 840, an incoming sound event 190 is processed by a probabilistic contextual filter. Data (the characteristics and/or sound genes) associated with an incoming sound event 190 include environmental non-audio data associated with the context in which the sound occurs and/or is occurring. Contextual data is accessed and/or retrieved from a user's environment at a given rate and is compared with data in the library of reference sounds 121 and the reference database. Incoming sound genes are compared with reference data to determine a probability of match between incoming and referenced sound genes (data sets). The match probability is calculated by computing a multidimensional distance between contextual data associated with previous sound events and contextual data associated with the current event. After a set number of iterations, events, and/or matches a heat map that can be used for filtering is generated by the probabilistic contextual filter of the sound source identification system 110. The filter is assigned a weighting factor. The assigned weight for non-audio data can be high if the user has communicated with the sound source identification system 110 that contextual features are important. A user can, for example, can explicitly indicate geographical or temporal features of note. In an embodiment, the sound source identification system 110 uses a probabilistic layer based on contextual non-audio data during search for pre-learned sound events in real time. The system is also capable of identifying contextual features, or other characteristics, that appear to be important in making sound event source determinations.

In a third stage 860, an incoming sound event 190 is acted upon by a multidimensional distance computing process. When a reference event matches an incoming event of interest with a sufficiently high probability, a reference event is compared at least one time per second to incoming data associated with the event of interest. In one exemplary embodiment, a comparison can be made by computing an N-dimensional sound event distance between data characteristics of a reference and incoming sound. A set of characteristic data, i.e., the distance vector, can be considered a sound gene. For each reference sound event, a distance is computed between each of its sound genes the sound genes retrieved from the user's environment, leading to an N-dimensional space, as described in greater detail above.

If more than one reference sound event is identified as a probable match for an incoming sound event, more than one reference sound event can be processed further. If a plurality of sound events identified they can be ranked by priority. For example, a sound event corresponding to an emergency situation can be given a priority key that prioritizes the significance this sound event over all other sound events.

In a fourth stage 880, the sound genes associated with an incoming sound event 190 are acted upon by a decision engine. In one exemplary embodiment, given an N-dimensional distance between a reference sound event and an incoming sound event, data is processed to determine if each reference sound event is in the incoming sound event. A set of at least one primary rule is applied to reduce the dimension of an N-dimensional distance. A rule can consist of a weighting vector that can be applied to the N-dimensional distance and can be inferred from a set of sound genes. The process need not rely on performing a comparison of features retrieved from an incoming signal to search, compare with and rank candidates in a library. The method enables increased processing speeds and reduced computational power. It also limits the number of candidates in need of consideration. This step can be executed without feedback from a user. This process is described in greater detail above.

A plurality of sound events can be contained in a library database. A sound event can be a part of an initial library installation on a user's device as part of or separate from the software application. A sound event can be added to a library database by a user or so directed by an application upon receiving requisite feedback/input from a user. In one exemplary embodiment, a second decision layer can be combined with a primary rule enabling the sound source identification system 110 to use a user's feedback to modify the learning layer of sound events. Each can lead to the generation of a new Support Vector Machine model. A Support Vector Machine model can be systematically used to make a binary categorization of an incoming signal.

According to an embodiment of the present invention, the sound source identification system 110 can identify sounds in real time, can allow its user to enter sound events of interest to the user in a library of reference sounds 121 or a remote database 171, can work with or without a network connection, and can run at least on a smartphone. An embodiment of the present invention enables crowd-sourced sound identification and the creation of open source adaptive learning and data storage of sound events. Process efficiency is improved with each sound identification event to fit a user's needs and by learning from a user. It further can enable open sourced improvements in sound recognition and identification efficiency. An embodiment further enables integration of the sound source identification system 110 with existing products and infrastructures.

Visualization of Sound Event

In one embodiment, the sound source identification system 110 can include an interactive user interface 140 as illustrated in exemplary embodiments in FIGS. 22-25, as well as some earlier embodiments in the present disclosure. This interactive user interface 140 can prompt a user for input and can output a machine visual representation of an incoming sound event 182, as shown in the example in FIG. 22.

One of skill in the art will appreciate that a plurality of sound events, including but not limited to an incoming sound event, can be communicated to a user and displayed on a device. One of skill in the art will appreciate that a visual representation 182 of an incoming sound event 190 is only one of many possible forms of user detectable machine representations. A user can be alerted to and/or apprised of the nature of a sound event by a plurality of signals that can be, but are not limited to, a flash light, a vibration, and written or iconic display of information about the sound, for example "smoke detector," "doorbell," "knocks at the door," and "fire truck siren." The sound source identification system 110 can receive audio and non-audio signals from the environment and alert a user of an important sound event according to user pre-selected criteria.

An alert signal can be sent to and received directly from the interactive user interface 140 on a mobile device 130. One of skill in the art will appreciate that an alert signal can, via SMS, be sent to and received from any number of devices, including but not limited to a remote host device 135, remote hardware components 160 and the central intelligence unit 170.

A representation of an incoming sound event 190 can be displayed in real-time continuously on a screen 180 of a mobile device 130 and can be sufficiently dynamic to garner user attention. A representation of an incoming sound event 190 can be of sufficient coherency to be detectable by the human eye and registered by a user and mobile device 130 as an event of significance. It can be or cannot be already classified or registered in a library of reference sounds 121 at the time of encounter. Processing an incoming sound event 190 can increase process efficiency and contribute to machine learning and efficacy of identifying a new sound.

Figure 23:
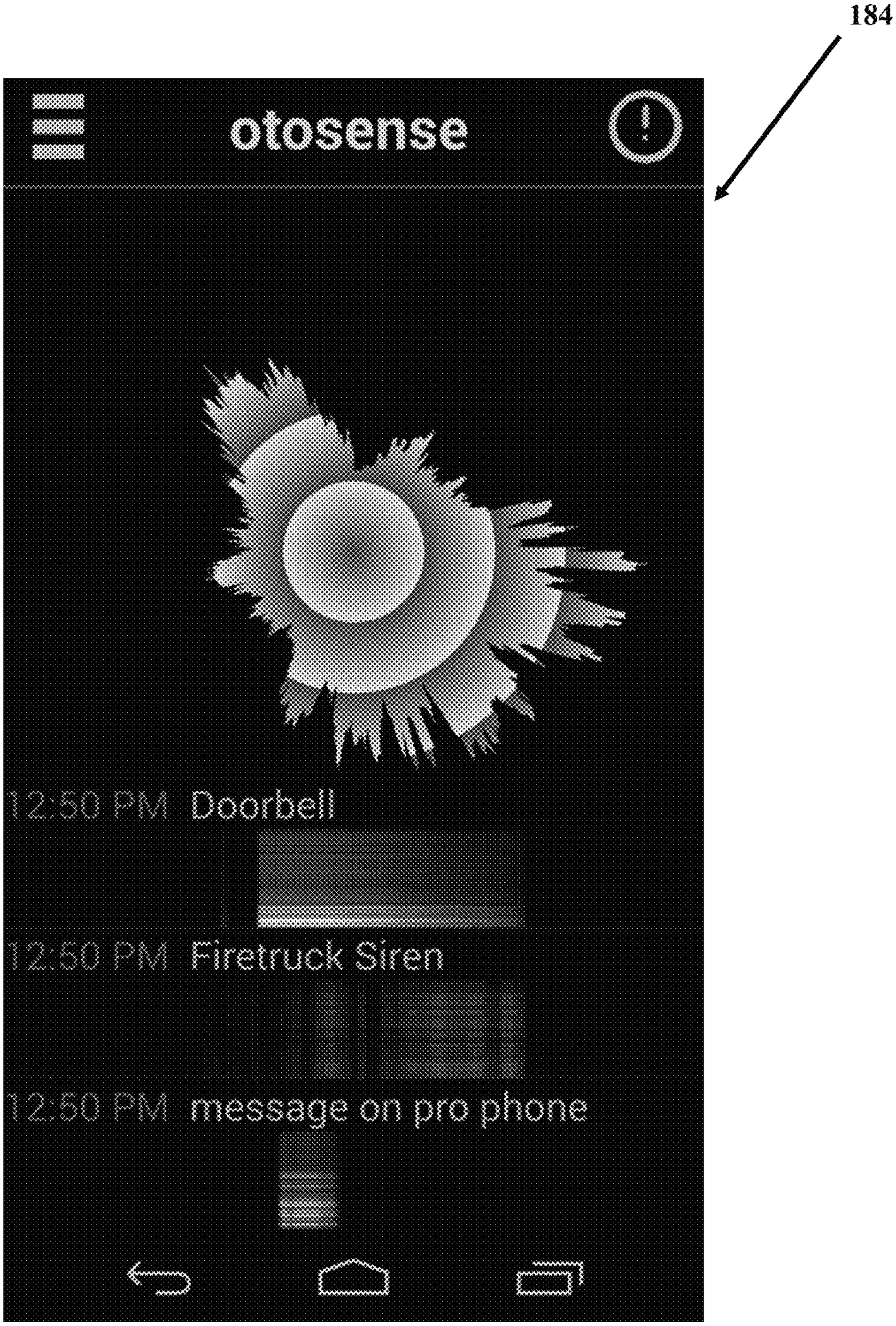
FIG. 23 is a screen capture of a display screen illustrating another exemplary embodiment of a visual representation of an incoming sound event at one point in time.

FIG. 23 depicts an illustrative example of a snapshot in time of a visual representation of an identified sound event 182 displayed on an interactive user interface 140 of a device screen 180. The snapshot is integrated into a mobile device 130 equipped with a sound source identification system 110. The sound source is identified, displayed, and labeled on the mobile device screen 180 as a doorbell.

Figure 24:
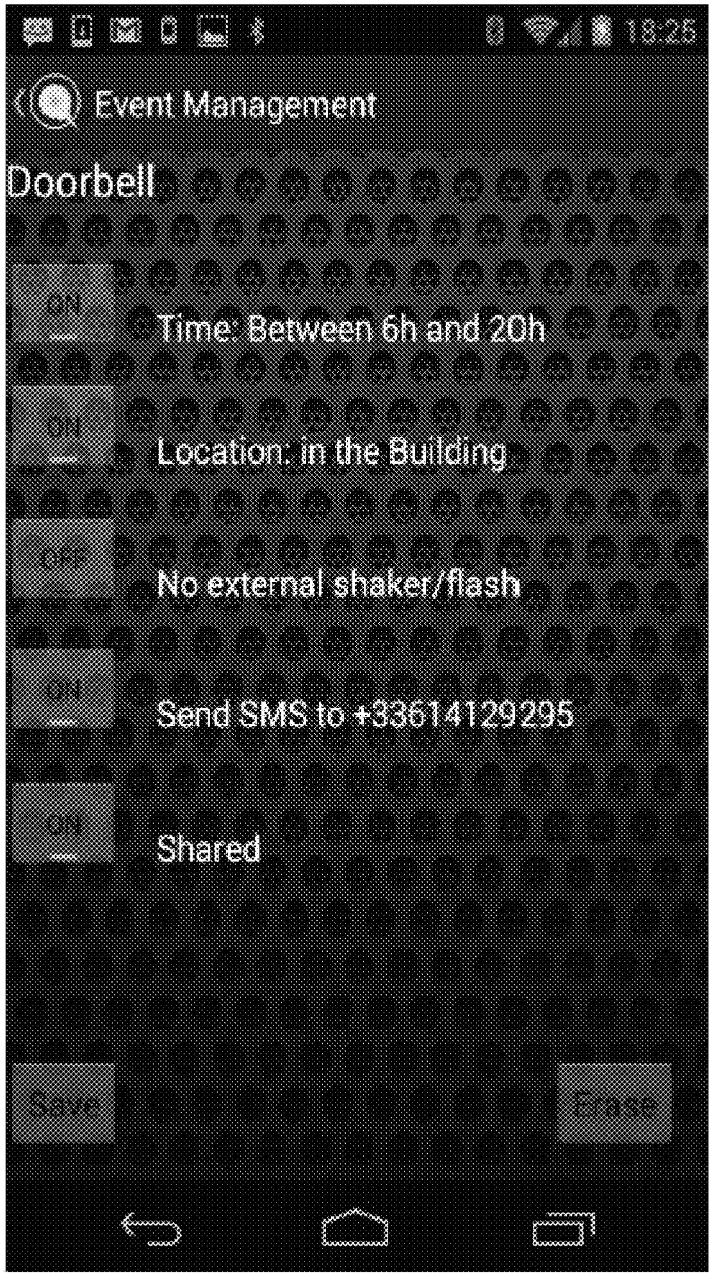
FIG. 24 is a screen capture of a display screen illustrating one exemplary embodiment of an interactive user interface for use in relation to an incoming sound event.

FIG. 24 depicts an illustrative snapshot of an event management card 184 displayed on an interactive user interface 140 of a screen 180 of a mobile device 130 directed toward sound source identification. Each incoming sound event 190 receives an identification insignia on the event management card 184 displayed by the interactive user interface 140 on the screen 180 of the mobile device 130. The event management card 184 enables a user to manage data associated with the incoming sound event and allows the user to define user preferred next steps following identification of the incoming sound event 190. For example, each incoming sound event 190 can be sent by default upon recognition or can be user selected for sending by SMS to a third party 900.

Figure 25:
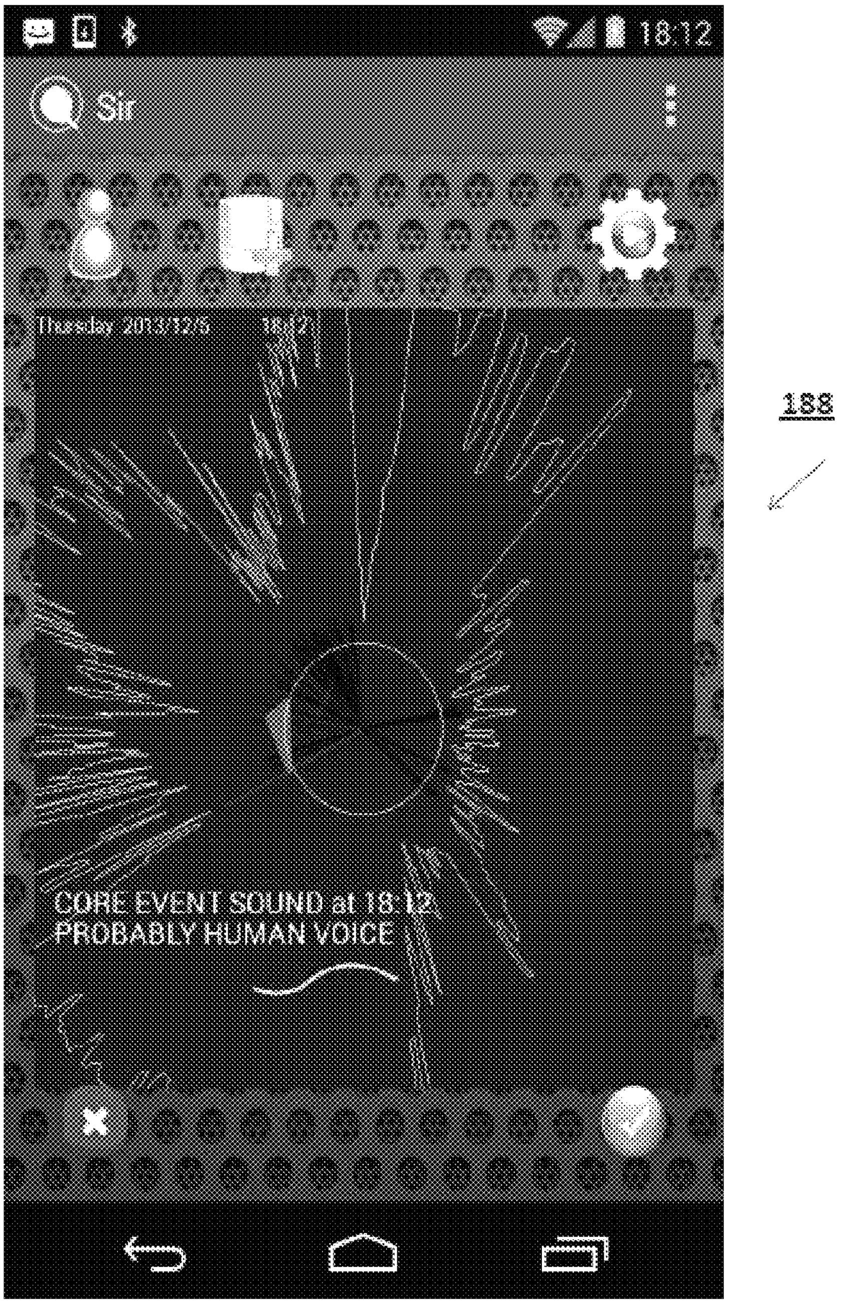
FIG. 25 is a screen capture of a display screen illustrating another exemplary embodiment of a visual representation of an incoming sound event at one point in time.

FIG. 25 depicts an illustrative example of the visual representation of an incoming sound event 190 displayed on the screen 180 of a mobile device 130 and the probable source of origin 168 of the incoming sound event 190. The incoming sound event 190 is a sound event (describable by associated sound genes) that is not recognized with reference to a sound event (describable by associated sound genes) that are stored in the library of reference sounds 121 and the remote database 171.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for identifying sound events, comprising:

receiving one or more signals corresponding to incoming sound events;

for each of one or more of the incoming sound events:

deconstructing the corresponding signal into one or more audio chunks;

determining one or more sound identification characteristics based on the corresponding one or more audio chunks;

generating a sound vector based on the corresponding sound identification characteristics;

determining, in real time, if the incoming sound event matches one or more of a plurality of predefined sound events, the determination being performed by each of the predefined sound events for its respective predefined sound event; and identifying the incoming sound event based on the determination performed by the plurality of predefined sound events.

2. The method of claim 1, wherein the determining if the incoming sound event matches one or more of the plurality of predefined sound events comprises:

comparing the sound vector of the incoming sound event to the sound vectors of the plurality of predefined sound events; and generating, based on the comparison, a distance vector comprising a calculated distance between the one or more sound identification characteristics of the incoming sound event and corresponding sound identification characteristics of each of the plurality of predefined sound events included in the sound vectors of the plurality of predefined sound events.

3. The method of claim 1, wherein the one or more calculated distances of the distance vector include one or more distances that are representative of at least one of:

a Soft Surface Change History, Main Ray Histories Matching, Surface Change History Autocorrelation Matching, Spectral Evolution Signature Matching, a Pulse Number Comparison, a location, a time, a day, a position of a device that receives the signal from the incoming sound event, an acceleration of the device that receives the signal from the incoming sound event, and a light intensity detected by the device that receives the signal of the incoming sound event.

4. The method of claim 1, wherein the adjusting of the one or more commensurate values in the sound vectors of the plurality of predefined sound events according to the user-provided information further comprises adjusting relative weights of one or more dimensions of the sound vectors of one or more of the plurality of predefined sound events.

5. The method of claim 1, further comprising, prior to or during the step of comparing in the sound vector of the incoming sound event to the sound vectors of the plurality of predefined sound events stored in a database, optimizing the comparing step by eliminating from consideration one or more of the plurality of predefined sound events based on commensurate information relating to the incoming sound event and the one or more of the plurality of predefined sound events.

6. The method of claim 5, wherein the optimizing the comparing step further comprises performing at least one of the following optimization steps:

performing a Strong Context Filter, performing a Scan Process, and performing a Primary Decision Module.

7. The method of claim 1, further comprising:

identifying which of the one or more the sound identification characteristics of the sound vector of the incoming sound event or of the plurality of predefined sound events have the greatest impact on the identity of the incoming sound event; and comparing at least a portion of the one or more identified sound identification characteristics of the sound vector of the incoming sound event to the commensurate sound identification characteristics of a sound vector of the plurality of predefined sound events before comparing other sound identification characteristics of the sound vector of the incoming sound event to the other commensurate sound identification characteristics of the sound vector of the plurality of predefined sound events.

8. The method of claim 1, further comprising:

prior to the determining the one or more sound identification characteristics of the incoming sound event based on the corresponding one or more audio chunks;

multiplying the one or more audio chunks, by a Hann window; and performing a Discrete Fourier Transform on the one or more audio chunk that is multiplied by the Hann window.

9. The method of claim 8, further comprising:

performing a logarithmic ratio on the one or more audio chunks after the Discrete Fourier Transform is performed; and rescaling a result after the logarithmic ratio is performed.

10. The method of claim 1, wherein the one or more sound identification characteristics include at least one of:

a Soft Surface Change History, a Soft Spectrum Evolution History, a Spectral Evolution Signature, a Main Ray History, a Surface Change Autocorrelation, a Pulse Number, a location, a time, a day, a position of a device that receives the signal from the incoming sound event, an acceleration of the device that receives the signal from the incoming sound event, and a light intensity detected by the device that receives the signal of incoming sound event.

11. The method of claim 1, wherein the determining, in real time, if the incoming sound event matches one or more of the plurality of predefined sound events is performed at least partially simultaneously by two or more of the plurality of predefined sound events.

12. The method of claim 1, wherein the determining, in real time, if the incoming sound event matches one or more of the plurality of predefined sound events is performed at least partially simultaneously by two or more of the plurality of predefined sound events for two or more of the incoming sound events.

13. The method of claim 1, further comprising:
outputting the identity of the incoming sound event;
receiving user-provided information relating to the incoming sound event; and
adjusting one or more commensurate values in sound vectors of the plurality of predefined sound events based on the user-provided information.

14. A method for creating a sound identification gene, comprising:
deconstructing one or more audio signals into a plurality of audio chunks;
determining one or more sound identification characteristics for one or more audio chunks of the plurality of audio chunks;
calculating one or more values of sound vectors for the one more audio signals based on the corresponding one or more sound identification characteristics; and
formulating sound identification genes corresponding to the one or more audio signals based on an N-dimensional comparison of the calculated one or more values of the sound vectors with one or more values of sound vectors of predefined sound events stored in a database, where N represents the number of calculated values,
wherein the N-dimensional comparison is performed by the predefined sound events.

15. The method of claim 14, further comprising adjusting a profile of the sound identification genes for the one or more of the one or more predefined sound events according to the user-provided information by adjusting relative weights of one or more values of the sound vectors for the sound identification genes.

16. The method of claim 15, wherein the adjusting of the relative weights further comprises adjusting a hyper-plane extending between identified true positive results and identified false positive results for the sound identification genes.

17. The method of claim 14, wherein the one or more sound identification characteristics include at least one of:
a Soft Surface Change History, a Soft Spectrum Evolution History, a Spectral Evolution Signature, a Main Ray History, a Surface Change Autocorrelation, a Pulse Number, a location, a time, a day, a position of a device that receives the one or more audio signals, an acceleration of the device that receives the one more audio signals, and a light intensity detected by the device that receives the one or more audio signals.

18. The method of claim 14, wherein the one or more values of the sound vectors include one or more distances that are representative of at least one of:
a Soft Surface Change History, Main Ray Histories Matching, Surface Change History Autocorrelation Matching, Spectral Evolution Signature Matching, a Pulse Number Comparison, a location, a time, a day, a position of a device that receives the one or more audio signals, an acceleration of the device that receives the one or more audio signals, and a light intensity detected by the device that receives the one or more audio signals.

19. The method of claim 14, wherein the N-dimensional comparison is performed at least partially simultaneously by two or more of the predefined sound events.

20. The method of claim 19, wherein the N-dimensional comparison is performed at least partially simultaneously by two or more of the predefined sound events for two or more of the audio signals.

21. The method of claim 14, further comprising:
outputting the sound identification genes of the one or more audio signals;
receiving user-provided information related to the one or more audio signals; and
adjusting a profile of the sound identification genes of one or more of the one or more predefined sound events according to the user-provided information.

22. A method for identifying a sound event, comprising:
receiving, via an audio signal receiver of a sound identification system, a signal from an incoming sound event;
deconstructing, by a processor of the sound source identification system, the signal into a plurality of audio chunks;
determining, by the processor, one or more sound identification characteristics of the incoming sound event for one or more audio chunks of the plurality of audio chunks;
calculating, by the processor, one or more values of a sound vector of the incoming sound for each of the one or more sound identification characteristics;
identifying, by the processor, which of the one or more values of the sound vector of the incoming sound event or one or more predefined sound events have the greatest impact on determining the identity of the incoming sound event;
comparing, by the processor, in real time the sound vector of the incoming sound event to a sound vector of the one or more predefined sound events stored in a database and calculating, by the processor, one or more commensurate distances of a distance vector for each of the one or more sound identification characteristics with respect to each of the one or more predefined sound events, wherein one or more of the identified values of the sound vector of the incoming sound event having the greatest impact on determining the identity of the incoming sound event are compared to the commensurate values of the sound vector of the one or more predefined sound events before other values of the sound vector of the incoming sound event are compared to the other commensurate values of the sound vector of the one or more predefined sound events;
identifying, by the processor, the incoming sound event based on the comparison of the one or more commensurate distances of the distance vector between the incoming sound event and each of the one or more predefined sound events stored in the database; and
communicating, by the processor, an identity of the incoming sound event to a user.

23. The method of claim 22, further comprising:
prior to determining one or more sound identification characteristics of the incoming sound event for an audio chunk, multiplying the audio chunk by a Hann window; and
performing a Discrete Fourier Transform on the audio chunk that is multiplied by a Hann window.

24. The method of claim 23, further comprising:
performing a logarithmic ratio on the audio chunk after the Discrete Fourier Transform is performed; and
rescaling a result after the logarithmic ratio is performed.

25. The method of claim 22, wherein the one or more sound identification characteristics include at least one of:
a Soft Surface Change History, a Soft Spectrum Evolution History, a Spectral Evolution Signature, a Main Ray History, a Surface Change Autocorrelation, a Pulse Number, a location, a time, a day, a position of a devices that receives the signal from the incoming sound event, an acceleration of the device that receives the signal from the incoming sound event, and a light intensity detected by the devices that receives the signals of the incoming sound event.

26. The method of claim 22, wherein the one or more distances of a distance vector include one or more distances that are representative of at least one of:

a Soft Surface Change History, Main Ray Histories Matching, Surface Change History Autocorrelation Matching, Spectral Evolution Signature Matching, and a Pulse Number Comparison, a location, a time, a day, a position of a device that receives the signal from the incoming sound event, an acceleration of the device that receives the signal from the incoming sound event, and a light intensity detected by the device that receives the signal of incoming sound event.

27. The method of claim 22, wherein adjusting one or more commensurate values in the sound vector of the predefined sound events stored in the database according to the information related to the incoming sound event received from the user further comprises adjusting relative weights of one or more dimensions of the sound vector for one or more predefined sound events.

28. The method of claim 22, further comprising, prior to or during the step of comparing in real time the sound vector of the incoming sound event to a sound vector of one or more predefined sound events stored in a database, optimizing the comparing step by eliminating from consideration one or more of the predefined sound events based on commensurate information known about the incoming sound event and the one or more predefined sound events.

29. The method of claim 28, wherein optimizing the comparing step further comprises performing at least one of the following optimization steps:

performing a Strong Context Filter, performing a Scan Process, and performing a Primary Decision Module.

30. A sound source identification system, comprising:

an audio signal receiver;

a processor dividing an audio signal received by the audio signal receiver into a plurality of audio chunks, the processor being operable to control:

an analyzer operable to:

determine one or more sound identification characteristics of one or more audio chunks of the plurality of audio chunks, compare in real time the received audio signal to one or more predefined sound events stored in a database, calculate one or more distances of a distance vector between the received audio signal and each of the one or more predefined sound events in the database, and identify the received audio signal based on the distances of calculated distance vectors;

a user interface operable to communicate an identity of the received audio signal to a user; and an adaptive learning module operable to identify one or more values associated with one or more of the sound identification characteristics of a received audio signal or a predefined sound event that has the greatest impact on determining the identity of the received audio signal so that the identified greatest impact values of the received audio signal and the one or more predefined sound events can be compared before to comparing other values of the received audio signal and the one or more predefined sound events when identifying the received audio signal.

31. The system of claim 30, wherein the one or more sound identification characteristic determined by the analyzer include at least one of:

a Soft Surface Change History, a Soft Spectrum Evolution History, a Spectral Evolution Signature, a Main Ray History, a Surface Change Autocorrelation, and a Pulse Number.

32. The system of claim 30, wherein the one or more distances calculated by the analyzer include one or more distances that are representative of at least one of:

a Soft Surface Change History, Main Ray Histories Matching, Surface Change History Autocorrelation Matching, Spectral Evolution Signature Matching, and a Pulse Number Comparison.

33. The system of claim 30, wherein the user interface is in communication with the analyzer and configured to allow a user to input information that the analyzer can use to adjust at least one of one or more characteristics and one or more distances of the one or more predefined sound events stored in the database.

34. A system, comprising:

at least one memory; and a processor operable to:

receive, via an audio signal receiver, one or more audio signals;

divide the one or more audio signals into a plurality of audio chunks;

cause an analyzer to:

determine one or more sound identification characteristics based on the plurality of audio chunks;

compare, in real time, the sound identification characteristics of the one or more audio signals to corresponding sound identification characteristics of one or more predefined sound events stored in a database;

calculate, based on the comparison, one or more distances of a distance vector comprising distances between the one or more audio signals and the one or more predefined sound events; and identify the one or more audio signals based on the calculated distances of the distance vectors, wherein the comparing and the calculating are performed by each of the one or more predefined sound events.

35. The system of claim 34, wherein the comparing and the calculating are performed at least partially simultaneously by two or more of the one or more predefined sound events.

36. The system of claim 34, wherein the comparing and the calculating are performed at least partially simultaneously by two or more of the plurality of predefined sound events for two or more of the audio signals.

37. The system of claim 34, the processor being operable to:

communicate, via a user interface, an identity of the one or more audio signals to a user;

receive, via the user interface, user-provided information related to the one or more audio signals; and adjust at least a portion of the one or more sound identification characteristics of one or more of the one or more predefined sound events based on the information received from the user.

38. The system of claim 34, wherein the one or more sound identification characteristics include at least one of:

a Soft Surface Change History, a Soft Spectrum Evolution History, a Spectral Evolution Signature, a Main Ray History, a Surface Change Autocorrelation, and a Pulse Number.

39. The system of claim 34, wherein the one or more distances include one or more distances that are representative of at least one of:

a Soft Surface Change History, Main Ray Histories Matching, Surface Change History Autocorrelation Matching, Spectral Evolution Signature Matching, and a Pulse Number Comparison.

40. The system of claim 34, wherein the processor is further operable to receive user input information for adjusting at least one of the one or more characteristics and the one or more distances corresponding to the one or more predefined sound events.

41. The system of claim 34, wherein the processor is further operable to:

identify which of the one or more of sound identification characteristics of one of the one or more audio signals or of one of the one or more predefined sound events has the greatest impact on determining the identity of the one of the one or more audio signals such that the identified greatest impact sound identification characteristics can be used for the comparing before other sound identification characteristics different than the greatest impact sound identification characteristics.

* * * * *